US012364648B2

(12) United States Patent
Kriheli et al.

(10) Patent No.: US 12,364,648 B2
(45) Date of Patent: Jul. 22, 2025

(54) COMPONENTS OF OPEN LIQUID DRUG TRANSFER SYSTEMS AND A ROBOTIC SYSTEM EMPLOYING THEM

(71) Applicant: EQUASHIELD MEDICAL LTD., Tefen Industrial Park (IL)

(72) Inventors: Marino Kriheli, Tel Aviv (IL); Raanan Tavor, Yuvalim (IL); Eric Shem-Tov, Ramat-Hasharon (IL)

(73) Assignee: EQUASHIELD MEDICAL LTD., Tefen Industrial Park, IL (US)

( * ) Notice: Subject to any disclaimer, the term of this patent is extended or adjusted under 35 U.S.C. 154(b) by 601 days.

(21) Appl. No.: 17/628,068

(22) PCT Filed: Jul. 27, 2020

(86) PCT No.: PCT/IL2020/050829
§ 371 (c)(1),
(2) Date: Jan. 18, 2022

(87) PCT Pub. No.: WO2021/019532
PCT Pub. Date: Feb. 4, 2021

(65) Prior Publication Data
US 2022/0257470 A1 Aug. 18, 2022

(30) Foreign Application Priority Data
Jul. 30, 2019 (IL) .......................................... 268368

(51) Int. Cl.
*A61J 1/20* (2006.01)
*A61J 3/00* (2006.01)
*B65B 3/00* (2006.01)

(52) U.S. Cl.
CPC ............. *A61J 1/201* (2015.05); *A61J 1/2055* (2015.05); *A61J 1/2075* (2015.05); *A61J 1/2082* (2015.05);
(Continued)

(58) Field of Classification Search
CPC ........ A61J 1/201; A61J 1/2055; A61J 1/2075; A61J 1/2082; A61J 1/2086; A61J 1/2096;
(Continued)

(56) References Cited

U.S. PATENT DOCUMENTS 4,743,243 A * 5/1988 Vaillancourt ......... A61J 1/2096 604/405
4,842,028 A * 6/1989 Kaufman .................. A61J 1/20 141/330
(Continued)

FOREIGN PATENT DOCUMENTS

CN 101437463 A 5/2009
CN 102781396 A 11/2012
(Continued)

OTHER PUBLICATIONS

West Pharma, Vented Vial Adapter, Dual-Channel spike facilitates rapid, large-volume withdrawal without pressurizing the vial, Dec. 22, 2017, retrieved on Jan. 18, 2022 from http://www.westpharma.com/products/reconstitution-and-transfer-systems/vial-adapters.
(Continued)

*Primary Examiner* — Nicolas A Arnett
(74) *Attorney, Agent, or Firm* — Dorsey & Whitney LLP

(57) ABSTRACT

Presented herein are a robotic system that is configured for compounding and preparation of medications comprising non-hazardous drugs and a vented drug vial adapter. The robotic system comprises: a laminar flow cabinet; and at least one robotic arm. The vented drug vial adapter is designed to connect a drug vial to another component of a drug transfer system. The adapter comprises a hydrophobic filter that prevents passage of liquid while allowing air to pass through it and a vent hole to the atmosphere. The vent hole is located above the filter thereby allowing equalization
(Continued)

of the internal pressure while preventing the drug from contaminating the atmosphere.

8 Claims, 30 Drawing Sheets

(52) U.S. Cl.
CPC ........... *A61J 1/2086* (2015.05); *A61J 1/2096* (2013.01); *A61J 3/002* (2013.01); *B65B 3/003* (2013.01)

(58) Field of Classification Search
CPC .. A61J 1/2065; A61J 1/20; A61J 1/065; A61J 1/10; A61J 1/1406; A61J 1/2048; A61J 3/002; B65B 3/003; B25J 9/02; B25J 11/009; B25J 18/00
See application file for complete search history.

(56) References Cited

U.S. PATENT DOCUMENTS

| | | | | |
|---|---|---|---|---|
| 5,309,959 | A * | 5/1994 | Shaw | B65B 3/003 141/130 |
| 5,431,201 | A * | 7/1995 | Torchia | B65B 3/003 901/6 |
| 8,196,614 | B2 * | 6/2012 | Kriheli | B65D 51/002 141/330 |
| 8,820,365 | B2 * | 9/2014 | Aguerre | A61M 5/1782 141/2 |
| 9,510,997 | B2 * | 12/2016 | Kriheli | A61J 1/2082 |
| 9,610,222 | B2 * | 4/2017 | Kriheli | A61J 1/2082 |
| 9,808,402 | B2 * | 11/2017 | Murakami | A61J 1/2096 |
| 9,877,895 | B2 * | 1/2018 | Garfield | A61M 5/31 |
| 10,181,186 | B2 * | 1/2019 | Kriheli | G06V 30/224 |
| 10,894,317 | B2 * | 1/2021 | Garfield | B25J 15/0042 |
| 11,590,057 | B2 * | 2/2023 | Tagliamento | A61J 1/2062 |
| 11,857,497 | B2 * | 1/2024 | Shem-Tov | A61J 3/002 |
| 2002/0193777 | A1 | 12/2002 | Aneas | |
| 2006/0058741 | A1 * | 3/2006 | Gallagher | A61M 5/1411 604/257 |
| 2006/0259195 | A1 * | 11/2006 | Eliuk | B01F 33/8442 700/245 |
| 2007/0156112 | A1 * | 7/2007 | Walsh | A61J 1/2096 604/415 |
| 2008/0172024 | A1 * | 7/2008 | Yow | A61J 1/2096 604/411 |
| 2010/0218846 | A1 * | 9/2010 | Kriheli | A61J 1/2096 141/5 |
| 2012/0270310 | A1 * | 10/2012 | Spence | G01N 35/0099 422/501 |
| 2012/0318402 | A1 * | 12/2012 | Aguerre | B65B 3/04 141/2 |
| 2014/0014210 | A1 * | 1/2014 | Cederschiold | A61M 5/3286 53/381.2 |
| 2015/0231034 | A1 * | 8/2015 | Lev | A61J 1/2089 604/405 |
| 2015/0359709 | A1 * | 12/2015 | Kriheli | A61J 1/2048 604/405 |
| 2016/0200462 | A1 * | 7/2016 | Kriheli | G06Q 10/06316 700/214 |
| 2018/0161243 | A1 | 6/2018 | Ariagno et al. | |
| 2018/0161245 | A1 * | 6/2018 | Kriheli | A61J 1/2096 |
| 2019/0221301 | A1 * | 7/2019 | Hang | A61M 5/3129 |
| 2021/0077353 | A1 * | 3/2021 | Kriheli | A61J 1/00 |

FOREIGN PATENT DOCUMENTS

| | | | |
|---|---|---|---|
| CN | 106458425 | A | 2/2017 |
| CN | 108348688 | B | 4/2021 |
| JP | S63139555 | A | 6/1988 |
| JP | 2015062824 | A | 4/2015 |
| WO | 2012118687 | A1 | 9/2012 |
| WO | 2016010157 | A1 | 1/2016 |
| WO | 2019167035 | A1 | 9/2019 |

OTHER PUBLICATIONS

International Search Report and Written Opinion mailed Oct. 14, 2020 in PCT application No. PCT/IL2020/050829.

* cited by examiner

COMPONENTS OF OPEN LIQUID DRUG TRANSFER SYSTEMS AND A ROBOTIC SYSTEM EMPLOYING THEM

FIELD OF THE INVENTION

The invention relates to the field of fluid transfer devices. Specifically the invention relates to components of open liquid drug transfer systems and their use in automated robotic systems for preparing drugs and medications for administration to patients.

BACKGROUND OF THE INVENTION

U.S. Pat. No. 8,196,614 to the applicant of the present invention describes closed system liquid transfer devices designed to provide contamination-free transfer of hazardous drugs. FIG. 1*a* and FIG. 1*b* are schematic cross-sectional views of the apparatus 10 for transferring hazardous drugs without contaminating the surroundings, according to one embodiment of the invention described in U.S. Pat. No. 8,196,614. The main features of this apparatus that are relevant to the present invention will be described herein. Additional details can be found in the aforementioned patent.

The proximal section of apparatus 10 is a syringe 12, which is adapted to draw a desired volume of a hazardous drug from a fluid transfer component, e.g. a vial 16 or an intravenous (IV) bag in which it is contained and to subsequently transfer the drug to another fluid transfer component. At the distal end of syringe 12 is connected a connector section 14, which is in turn connected to vial 16 by means of vial adapter 15.

Syringe 12 of apparatus 10 is comprised of a cylindrical body having a tubular throat that has a considerably smaller diameter than body, an annular rubber gasket or stopper assembly fitted on the proximal end of cylindrical body, hollow piston rod which sealingly passes through the stopper, and proximal piston rod cap by which a user can push and pull piston rod up and down through stopper. A piston 28 made of an elastomeric material is securely attached to the distal end of the piston rod.

The piston, which sealingly engages the inner wall of, and is moveable with respect to the cylindrical body defines two chambers of variable volume: a distal liquid chamber 30 between the distal face of piston and a connector section 14 and a proximal air chamber 32 between the proximal face of the piston and the stopper.

Connector section 14 comprises a cylindrical, hollow outer body; a distal shoulder portion, which radially protrudes from the body and terminates at the distal end with an opening through which the proximal end of a fluid transfer component is inserted for coupling; a double membrane seal actuator 34, which is reciprocally displaceable within the interior of the body; and one or more resilient arms 35 serving as connecting elements, which are connected at a proximal end thereof to an intermediate portion of a cylindrical actuator casing that contains double membrane seal actuator 34. Two hollow needles that function as air conduit 38 and liquid conduit 40 are fixedly retained in a needle holder, which protrudes into the interior of connector section 14 from a central portion of the top of connector section 14.

Conduits 38 and 40 distally extend from the needle holder, piercing an upper membrane of actuator 34. The distal ends of conduits 38 and 40 have sharp pointed ends and apertures through which air and liquid can pass into and out of the interiors of the conduits respectively as required during a fluid transfer operation. The proximal end of air conduit 38 extends within the interior of proximal air chamber 32 in syringe 12. In the embodiment shown, air conduit 38 passes through piston 28 and extends inside of the hollow piston rod. Air flowing through conduit 38 enters/exits the interior of the piston rod and exits/enters to air chamber 32 through an aperture formed at the distal end of the piston rod just above the piston. The proximal end of liquid conduit 40 terminates at the top of or slightly proximally from the top of the needle holder, so that the liquid conduit will be in fluid communication with the distal liquid chamber 30 via the interior of the throat of syringe 12.

Double membrane seal actuator 34 comprises a casing that holds a proximal disc shaped membrane 34*a* having a rectangular cross-section and a two level distal membrane 34*b*. The distal portion of the distal membrane 34*b* protrudes distally from actuator 34. Two or more equal length resilient elongated arms 35 are attached to the distal end of the casing of actuator 34. The arms terminate with distal enlarged elements. When actuator 34 is in a first position, the pointed ends of conduits 38 and 40 are retained between the proximal and distal membranes, preventing a user from being exposed to, and injured by, the pointed ends and also isolating the ends of conduits 30 and 40 from the surroundings, thereby preventing contamination of the interior of syringe 12 and leakage of a harmful drug contained within its interior to the surroundings.

Connector section 14 is adapted to be releasably coupled to another fluid transfer component, which can be any fluid container with a standard connector such as a drug vial, intravenous bag, or an intravenous line to produce a "fluid transfer assembly", through which a fluid is transferred from one fluid transfer component to another.

Drugs are commonly supplied in drug vials by pharmaceutical companies in powdered or liquid form. These drug vials have an elastomeric membrane at the top of the vial that can be pierced by a syringe needle to dilute (reconstitute) the powder with an appropriate solvent and to withdraw the dose of liquid drug required for administration to a patient from the vial. If liquid is injected into or withdrawn from a drug vial by piercing the membrane with a syringe then either overpressure or a vacuum will be created in the vial that can interfere with the transfer process. To enable equalization of pressure in the vial when liquid is injected into it or withdrawn from it an intermediate connection known as a vial adapter is used.

FIG. 2 and FIG. 3 show respectively a perspective view and a cross sectional view of a prior art vial adapter 15 that is designed to be a part of fluid transfer apparatus 10. Vial adapter 15 is an intermediate connection that is used to connect connector section 14 to a drug vial 16 or any other component having a suitably shaped and dimensioned port.

Vial adapter 15 comprises a collar portion 42 provided with an annular proximal cap 44 and an upwardly projecting structure 46 projecting proximally from cap 44. Upwardly projecting structure 46 is a second reason for using the vial adapter. It is much longer than the neck on a conventional drug vial and therefore fits into the opening at the distal end of connector section 14 to allow transfer of the drug as will be described herein below. Collar portion 42 consists of a plurality of circumferential segments 48 formed with a convex lip 50 on the inner face thereof, for facilitating securement to a head portion of a vial 14. Upwardly projecting structure 46 terminates proximally with a membrane enclosure 52 having a diameter larger than that of extension 42. Membrane enclosure 52 has a proximal central opening 54, by which membrane 15*a* retained therein is made accessible.

Two longitudinal channels 56 and 58, which are internally formed within the upwardly projecting structure and that extend distally from the membrane in the membrane enclosure, are adapted to receive conduits 38 and 40, respectively. A mechanical guidance mechanism is provided to insure that the conduits 38 and 40 will always enter their designated channel within the upwardly projecting structure when connector section 14 is mated with vial adapter 15. Upwardly projecting structure 46 terminates distally with a spike element 15*b* which protrudes distally from cap 44. Spike element 15*b* is formed with openings 60 and 62 in communication with channels 56 and 58, respectively.

Vial 16 has an enlarged circular head portion 64 attached to the main body of the vial with a neck portion. In the center of the head portion 64 is a proximal membrane 16*a*, which is adapted to prevent the outward leakage of a drug contained therein. When the head portion of vial 16 is inserted into the collar portion of vial adapter 15 and a distal force is applied to vial adapter 15, the spike element 15*b* of the vial adapter 15 pierces the membrane 16*a* of vial 16, to allow the internal channels in the vial adapter 15 to communicate with the interior of drug vial 16. When this occurs, the circumferential segments 48 at the distal end of the collar portion 42 of the connector section are securely engaged with the head portion of vial 16. After the membrane 16*a* of vial 16 is pierced it seals around the spike preventing the outward leakage of the drug from the vial. At the same time the tops of the internal channels in vial adapter 15 are sealed by the membrane 15*a* at the top of vial adapter 15, preventing air or drug from entering or exiting the interior of vial 16.

The procedure for assembling drug transfer apparatus 10 is carried out as follows: Step 1—After the vial 16 and vial adapter 15 have been joined together, with spike element 15*b* penetrating proximal membrane 16*a* of the vial, the head portion of vial adapter 15 is positioned close to the distal opening of connector section 14. Step 2—A double membrane engagement procedure is initiated by distally displacing the body of connector section 14 with an axial motion until the membrane enclosure and upwardly projecting structure of vial adapter 15 enters the opening at the distal end of the connector section 14. Step 3—the distal membrane 34*b* of actuator 34 is caused to contact and be pressed against the stationary membrane 15*a* of vial adapter 15 by additional distal displacement of the body of the connector section 14. After the membranes are pressed tightly together the enlarged elements at the ends of the arms of the connector section 14 are squeezed into the more narrow proximal section of connector section 14 thereby holding the membranes pressed together and engaged around the upwardly projecting structure and under the membrane enclosure of vial adapter 15, thereby preventing disengagement of the double membrane seal actuator 34 from vial adapter 15. Step 4—Additional distal displacement of the body of connector section 14 causes actuator 34 to move proximally relative to the body of the connector section 15 until the tips of conduits 38 and 40 pierce the distal membrane of actuator 34 and the membrane at the top of vial adapter 15 and are in fluid communication with the interior of vial 16.

After drug transfer assembly 10 shown in FIG. 1 is assembled as described hereinabove, the piston rod can be moved to withdraw liquid from vial 16 or to inject liquid from the syringe into the vial. The transfer of liquid between the distal liquid chamber 30 in the syringe 12 and liquid in the vial 16 and transfer of air between the proximal air chamber 32 in the syringe 12 and air in the vial 16 takes place by an internal pressure equalization process in which the same volumes of air and liquid are exchanged by moving through separate channels. This is a closed system which eliminates the possibility of exchange of air or liquid drops or vapor between the interior of assembly 10 and the surroundings.

Despite the care that was taken to separate air path through air channel 56 and air conduit 38 from the liquid path through liquid channel 58 and liquid conduit 40 there are locations in the prior art assembly described in U.S. Pat. No. 8,196,614 in which these paths intersect under certain conditions allowing for the possibility of liquid to travel through the air conduit from the distal liquid chamber 30 or vial 16 to the proximal air chamber.

Solutions to this problem are described in U.S. Pat. No. 9,510,997 to the applicant of the present invention. One of these solutions is to introduce a hydrophobic filter membrane 66 at some point in the air channel 38,58 between the vial 16 and the proximal air chamber 32. Such a filter, e.g. a 0.22 micron filter, will not only prevent passage of liquid into the proximal air chamber but also will improve the protection against microbial contamination by additionally filtering the air.

The location that has been determined to be the most effective and technically simple one to manufacture for introducing a filter into the air channel is to place it in the vial adapter 15. FIG. 4 is a cross-sectional view of a vial adapter 15 modified to comprise a hydrophobic filter membrane 66. The filter is made of a very thin disc shaped piece of material. A hole is cut through it to allow free passage of liquid through liquid channel 58 from membrane 15*a* to opening 62 at the tip of the spike element without passing through filter 66. The filter 66 is welded or glued or mechanically pressed to the vial adapter at its outer circumference 67 and inner circumference 67*a*. Air moves from opening 60 at the tip of spike element 15 via air channel 56 into an open space formed by the ribs 56 below filter 66, passes through filter 66 into an open space above the filter, and into a continuation of air channel 56 passing through upwardly projecting structure 46 to membrane 15*a*.

Pressure exerted on filter 66 by air or liquid flowing through air channel 56 could be great enough to tear the filter or to cause it to become crumpled or to clog the filter 66 by the liquid—even to the extent that air channel 56 becomes blocked. Therefore to provide mechanical support to withstand pressures, to prevent tearing, and to keep the filter straight and flat, filter 66 is placed between a plurality of closely spaced supporting ribs 68 from above and below.

A problem that frequently arises with prior art vial adapters is that, due to improper attaching of the vial adapter, to the vial they are prone to leak liquid and vapor to the surroundings and, vice versa, the drug in the vial is prone to microbial contamination when air from the surroundings enters the vial. The cause of this problem is that when attaching vial adapters manually, the spike is often not properly centered and/or typically is inserted into the stopper of the vial at an angle. Such inaccuracy will cause tearing of the vial rubber stopper when the vial adapter fully settles on the vial and the locking wings enforce centered position of the spike and adapter.

U.S. Pat. No. 9,510,997 describes a vial adapter designed to overcome the problem of tearing of the rubber stopper in the vial resulting from inaccurate insertion of the spike of the vial adapter. The vial adapter in this application is comprised of two parts—a bottom part adapted to be attached to the head of a standard medicine vial and a top part that is adapted to be coupled to the bottom part and also to another component of a medical transfer system such as the connector section of the drug transfer apparatus described herein above, or a syringe.

The method of operation of this vial adapter is to keep the spike enclosed and at distance from the rubber stopper of the vial until the vial adapter is properly placed and locked on the head portion of the vial. At this locked stage the spike has not yet contacted the stopper. The proper positioning and locking achieved in this way insures that the spike is fixed in a centered and perpendicular position in relation to the rubber stopper. Only then is the vial adapter ready to be further advanced with an axial motion to guide the spike to precisely pierce the stopper until, in its final position, the vial adapter is irremovably locked to the vial.

It is important to emphasize that the procedure is described herein as comprising several steps; however, this is for ease in describing the procedure only. It is to be realized that in actual practice the secured engagement procedure using the present invention is carried out using a single smooth axial movement.

FIGS. 5*a* and 5*b* are perspective drawings showing different views of the bottom part 202 of the vial adapter of U.S. Pat. No. 9,510,997. Bottom part 202 is a generally cylindrical structure with a hollow interior. The lower part of the structure has an inside diameter slightly larger than that of the cap of the vial to which it will be connected. On the inside of the lower part of bottom part 202 are a plurality of inwardly facing teeth 206. Teeth 206 are on the end of flexible arms that allow teeth 206 to be pushed radially outward and then to snap back into their original position when the outward force on them is removed. Also seen on the inside of the lower part of bottom part 202 are a plurality of inwardly facing teeth 208 associated with teeth 206. On the outside of the arms to which teeth 206 are attached there are projections 210 for locking together the two parts of the vial adapter.

FIG. 6 shows the top part 204 of the vial adapter 200. Top part 204 is a generally cylindrical structure. In the center of the structure is a downward projecting spike 218 that is in fluid communication with an upwardly projecting structure 220 designed to connect in a standard way to another component of a drug transfer system. Projecting downward are at least two wings 216, some of which have windows 214 in them that play a role in connecting the upper part 204 to the lower part as will be explained herein below.

Not shown in the figures are air and liquid channels that pass through the interior of vial adapter 200 from a membrane at the upper end of structure 220 to the tip of spike 218. The membrane and channels are analogous to membrane 15*a* and channels 56 and 58 shown in FIG. 4.

FIGS. 7*a* and 7*b* are perspective drawings showing different views of the vial adapter 200. Top part 204 has been slipped over and locked to bottom part 202 in a first locked configuration. In FIG. 7*a* it can be seen how the projections 210 on the bottom part 202 fit into windows 214 on the wings 216 of top part 204 to accomplish the locking together of the two parts of vial adapter 200, so they can't move with respect to each other even when pushed. Also seen in FIG. 7*a* are snaps 212 with inwardly facing teeth on the bottom edge of bottom part 202 and an outwardly facing ledge 222 around the circumference of top part 204. Snaps 212 and ledge 222 interact to lock top part 204 to bottom part 202 in a second locked configuration to be described herein below.

FIG. 8 to FIG. 11 show different stages in the telescopic attachment of vial adapter 200 to a vial.

In the first stage, shown in FIG. 8, the cap of the vial has not yet entered the interior of the bottom part of vial adapter 200. In the enlarged detail A it is seen how the projections 210 of bottom part 202 fit into windows 214 on wings 216 of upper part 204 locking the two parts together.

In the second stage, shown in FIG. 9, the cap of the vial is beginning to enter the interior of the bottom part of vial adapter 200. In the enlarged detail A it is seen how the how the teeth 206 and the teeth 208 are pushed radially outward by the cap of the vial while the wings 216 are pushed radially by the back side of the teeth 208. Projections 210 of bottom part 202 are pushed into the windows 214 on wings 216 of upper part 204 keeping the two parts locked together and not yet allowing the parts 104 and 202 to slide into each other.

In the third stage, shown in FIG. 10, the cap of the vial has entered the interior of the bottom part of vial adapter 200 to the end. In the enlarged detail A it is seen how the teeth 208 continue to push wing 216 radially outward. At the same time, the cap of the vial is no longer pushing the teeth 206 outwards allowing the arm to which teeth 206 and projections 210 are attached to spring radially inwards. As a result, teeth 206 move under the edge of the cap firmly attaching vial to the vial adapter 200 and projections 210 of bottom part 202 are pulled out of the windows 214 on wings 216 of upper part 204 thereby breaking the lock between the two parts.

It should be noticed that at this stage the spike has not yet contacted the stopper in the top of the vial; for this to happen all locks must open, which indicates that the adapter is fully attached and that the spike is in a centered and perpendicular position in relation to the vial rubber stopper and is ready to pierce precisely. If even one of the locks is not open the parts 202 and 204 will not move until all are in position and unlocked. As a consequence when in the fourth stage, shown in FIG. 11, the top part 204 of vial adapter is pushed downward towards the vial, the spike is pushed through the vial stopper exactly in the center and perpendicular to the vial stopper. As the top part 204 slides over the bottom part 202, wings 216 slide over and grip the sides of the vial adding more stability to the connection. Eventually the teeth on the top of snaps 212 slide over the top of ledge 222 locking both parts of vial adapter 200 together, thus prohibiting reverse motion that could pull the spike out of the vial. In embodiments of the vial adapter snaps 212 are constructed so that both an audible sound as well as visual observation will confirm to the user that the attachment process has been completed.

FIG. 12 shows vial adapter 200 irremovably attached in its final position to a medical vial.

An embodiment of vial adapter 200 designed to be coupled to transfer devices such as those described herein above can be provided with a filter located, for example, in the top part 204 above the spike as described herein above for vial adapter 15 (see FIG. 4).

FIG. 13 is a cross sectional view showing a spike adapter 160 used in conjunction with fluid transfer apparatus 10 to transfer a drug to and from an intravenous (IV) bag. Spike adaptor 160 comprises body 162 terminating in spike element 164 at the proximal end and a standard "twist off" end 166 to a spike port for connecting an infusion set at the distal end. Substantially at right angles to body 162 is a longitudinal extension 168. At the end of longitudinal extension 168 are membrane enclosure 170 and membrane 172. The interior of spike adapter 160 comprises two separated channels 174 and 176 for fluid and air from the tip of spike element 164 to membrane 172. A connector section 14 with attached syringe can connect to longitudinal extension 168 exactly as described hereinabove with respect to vial adaptor 15 of FIG. 3, thereby allowing insertion of a drug from the syringe into an IV bag or withdrawal of liquid from an IV bag into a syringe to be used for reconstitution of a drug.

The vial adapters and other components described herein above are presented to demonstrate the operating principles of Equashield® closed drug transfer systems. Over the years many improvements of these components have been developed and produced. For example many of these improvements have been made in the connector section 14, specifically in the actuator that holds the membrane that seals the connector section to the vial adapter. The double membrane seal actuator 34 shown in FIG. 1*a* is now replaced with a single membrane septum holder. The latest embodiment of which is described in co-pending Israeli patent application no. 261024 to the applicant of the present application. An exploded view of this septum holder, which comprises a moveable septum is shown in FIG. 14.

Septum holder 500 is comprised of a body part 560 and a septum support 561. Body part 560 comprises a disk shaped upper surface and side elements 592 that project downward from the upper surface. The elements 592 can have other shapes and sizes than those shown in the figures. Two equal length resilient elongated arms 562 that terminate with distal enlarged elements 563 are attached at its sides projecting vertically downwards parallel to each other as shown in FIG. 14. Two pairs of projecting elements 577 project vertically downwards from the lower surface of body part 560. Each pair of projecting elements 577 defines a slot 578 between the elements of the pair. Slots 578 pass vertically upward through the disk shaped upper surface of body part 560. Also seen in FIG. 14 are one of two windows 580 and one of two slots 589 in the elements 592 of body part 560 and holes 579 that pass through the upper surface of body part 560.

In the embodiment shown in the figure septum support 561 is comprised of a disk shaped septum seat 582 from which two resilient elongated arms 586 projects upward parallel to the arms 562. At the lower end of each arm 586 is an outwardly projecting shoulder 590 and at the upper end of each arm 586 is an outwardly projecting tooth-shaped element 588 having a lower horizontal surface and an upper sloped surface. An insert 568, which in this embodiment comprises two bores 570 (in an embodiment not shown comprises only one bore), forms the seats of two needle valves. One or two holes 579 (depending on the embodiment) are created in body part 560 to allow the needles to pass through septum holder 500. Insert 568 passes through opening 584 in septum seat 582 and is held in place by small spikes 581 and 583. The lower rim of the septum 572 is structured as an inwardly projecting edge that, when pushed over septum seat 582 holds septum 572 on septum seat 582.

Because of the length of the arms 586 of septum support 561 and other features of septum holder 500, septum seat 582 and attached insert 568 and septum 572 can be releasably held in an unblocked configuration and moved relative to the body part 560 to be locked in a blocked configuration.

In co-pending Israeli patent application no. 257778 the applicant of the present invention describes a novel apparatus for securing a male-female connection. The apparatus comprises: a female connector comprising a securing actuator section; a male connector; one or more anchoring ledges; and at least one rotatable gear. The apparatus is demonstrated for use in connecting components of a system for transferring liquids between two containers, e.g. a medicine vial to a syringe or vice versa.

FIG. 23 is a perspective view of the body of an embodiment of the female connector 1201 in which the interior of receiving section 1202 is visible through an opening 1203 in the proximal side of connector 1201. A ladder 1204 comprising a plurality of rungs (e.g. 1205), is formed on the front or back side of each of the left and right sides of the interior of receiving section 1202. A rail 1206 is formed on the opposite (i.e. back or front) side of each of the left and right sides of the interior of receiving section 1202. A track, generally indicated by numeral 1207, is defined between rail 1206 and ladder 1204, along which a gear may travel longitudinally, given that the gear comprises sprockets the size of which corresponds to the spaces between rungs 1205.

FIG. 24 is a perspective view of a securing actuator 1401, according comprising rotatable gears 1402, rotatably coupled to a guide 1403 on each side of a base 1407. Each gear 1402 comprises a plurality of sprockets (e.g. 1404) peripherally arranged around a void portion 1405, whereas a gap 1406 is formed by removal of a portion of the periphery thereby allowing access from beyond the gears' periphery to the void portion. Not shown in FIG. 24 is a membrane (see FIG. 28—ref. no. 1706) that is attached to the bottom of base 1407.

FIG. 25 is a cutaway perspective view of female connector 1201 with securing actuator 1401 present therein. Guides 1403 are located at tracks 1207 such that sprockets of each gear 1402 are inserted between the rungs 1205 of the ladder 1204. Longitudinal motion of actuator 1401 along the tracks 1207 causes gears 1402 to rotate due to the sprockets being forced to rotate about their axis of rotation. Accordingly, the orientation of gap 1406, relative to opening 1203, changes with the longitudinal motion of actuator 1401.

FIG. 26 is a cross-section view of a protruding section 1222 of a male connector 1221. Protruding section 1222 can be for example the upwardly projecting structures of the vial adapters shown in FIGS. 5*a*-12 or the spike adapter shown in FIG. 13. On opposite sides of the recess surrounding membrane 1224 at the top of protruding section 1222 are two anchoring ledges 1223.

FIGS. 27*a*-27*c* show perspective views of protruding section 1222 of a male connector inserted into receiving section 1202 of the female connector 1201 (shown in cutoff view). The width of anchoring ledges 1223 correspond to the size of gaps 1406 such that ledges 1223 may pass through gaps 1406 and be housed into void portions 1405. The height and depth of anchoring ledges 1223 correspond to the diameter and depth of void portions 1405, respectively, such that gear 1402 may rotate freely while a ledge 1223 is present inside the void portion 1405. FIG. 27*a* shows an anchoring ledge 1223 being inserted through gap 1406 into void portion 1405. In this position the rotation of gears 1402 is disabled because the gear's gaps 1406 hit the anchoring ledges 1223 from the side and subsequently any movement of the entire actuator 1401 is disabled. Upon further insertion of protruding section 1222 into receiving section 1202, anchoring ledge 1223 completely passes through gap 1406 and is accommodated within the void portion 1405, as shown in FIG. 27*b*. Upon yet further insertion of protruding section 1222 into receiving section 1202, gear 1402 rotates according to the direction dictated by ladder 1204 (i.e. clockwise in the embodiment show in FIG. 27*c*, as indicated by the circular arrow A). Upon initial rotation of gear 1402, the anchoring ledges 1223 get trapped and locked inside void portion 1405 and remain locked throughout the entire connection and disconnection processes. For the abovementioned process of two elastic membranes compression, the moment of initial rotation of gears 1402 means a precise locking position of the membranes in a specific inseparable squeeze. A further insertion of protruding section 1222 into receiving section 1202 causes the locked membranes to be pierced over stationary needles of the female connector.

In the position of actuator 1401 shown in FIG. 27*c* it is impossible for the anchoring ledges 1223 to leave void portions 1405, and therefore proximal displacement of the protruding section 1222 of the male connector 1221 is prevented, unless gear 1402 is rotated and anchoring ledges 1223 are released from the gears. Obviously, as will be apparent to the skilled person, in any position of the gear 1402 along ladder 204 in which gap 1406 is not opposite opening 1203, the anchoring ledges 1223 are kept inside void portion 1405.

At disconnection of the female connector 1201 from the male connector 1221 the process is reversed, extraction of protruding section 1222 out of the receiving section 1202 causes the gear 1402 to rotate counter clockwise along ladder 1204 until the anchoring ledges 1223 come opposite gap 1406 and are able to leave the void portion 1405. During disconnection in the above mentioned in parallel taking process, first the needles retract from the membranes and at the moment anchoring ledges 1223 come opposite gap 1406 and leave the void portion 1405 the membranes separate safely leaving their surfaces clean of any residuals of liquids).

FIG. 28 schematically illustrates a female connector 1201 and connected syringe 1704 of a drug transfer system viewed in cross-section. When actuator 1401 is at its lowest position in female connector 1201, needles 1703 and 1705 are located in a space above membrane 1706 and their tips are isolated from the surroundings. When actuator 1401 is pushed upwards (in FIG. 28 artificially without inserting a male connector) the needles 1703 and 1705, which is in this particular embodiment are part of connector 1201, perforate membrane 1706.

FIG. 29 shows a side cross-section of male 1221 and female 1201 connectors in a position in which the actuator 1401 with male connector 1221 attached by means of ledges 1223 locked inside gears 1402 has been pushed up as far as possible inside receiving section 1202 of female connector 1201 until their relative membranes 1224 and 1706 press on one another and the needles have perforated both membranes and are located inside the vial.

All of the improved components described herein above comprise separate internal channels for air and liquid to enable equalization of pressure when liquid is transferred from one container to another without venting or introducing air into the atmosphere.

In order to obtain maximum advantage to users of the Equashield® closed drug transfer systems the applicant has developed a fully automatic robotic system that is designed to assist a hospital pharmacy in the compounding of medications comprising hazardous drugs and to prepare syringes and IV bags comprising the required amount of liquid drug for administration to patients according to their individual prescriptions. The system is described in detail in U.S. Pat. No. 10,181,186. The system comprises a biological safety cabinet and at least two robotic arm assemblies configured to simultaneously move vials and syringes within the safety cabinet. Each of the robotic arm assemblies comprises three mechanical arrangements configured to independently move either a vial gripper assembly or a syringe gripper assembly and syringe pump in three dimensions along three mutually orthogonal beams. Within the cabinet are a plurality of operational stations adapted to perform specific tasks related to the compounding process. The operating stations include:

at least one reconstitution module configured to allow at least one vial to be connected to it and to inject a predetermined volume of liquid into the vial; at least one vial shaker module configured to allow one or more vials containing reconstituted drugs to be connected to it and shaken for a predetermined period of time and predetermined shaking method; at least one vial flipper module configured to allow at least one vial to be connected to it and to invert the vials; at least one IV bag base module to which the operator of the system can attach IV bags; a syringe magazine; a plurality of cameras each installed at a specific location in the safety cabinet or on the robotic arm assemblies, and a processor. Each of the cameras is dedicated to provide real time digital images of the stage of the preparation process carried out at its location. Dedicated software and algorithms in the system processor allow almost all steps in the compounding process to be carried out automatically by the robotic arm assemblies without intervention by the operator or a supervisor and the cameras and imaging process algorithms are adapted to provide real-time feedback control of all stages of the compounding process.

FIG. 22*a* is a schematic view of the safety cabinet with part of the external walls and interior partitions removed to show how the internal space is arranged to receive the vials, syringes and IV bags that are "loaded" into it by the operator. In FIG. 22 are shown the working surface 816, the vial insertion area 842, two IV bag base modules 826(1) and 826(2), two syringe pump robotic arm assemblies 838, syringe magazine 840, and a vial robotic arm assembly 828.

FIG. 22*b* schematically shows vial robotic arm assembly 828. Under direction of the software of the system vial robotic arm assembly 828 is configured to pick up vials from vial insertion area 842, move them to any location on working surface 816 behind an interior partition; to connect and disconnect them from a reconstitution module, shakers, and flip mechanisms; and to release them at a new location on working surface 816 or in a discard bin. The degrees of motion required to carry out these tasks are provided by a mechanical arrangement, for example, an x-axis motor and gear box 848 that turn a screw, a chain, or a belt, to move y-axis motor and gear box 852 in the x-direction along x-axis beam 850. Y-axis motor and gear box 852 turns a screw to move z-axis motor and gear box 856 in the y-direction along y-axis beam 854. Z-axis motor and gear box 856 moves vial gripper assembly 860 up and down in the z-direction along z-axis beam 858. Motors 848, 852, and 856, as well as all other motors in the system, are reversible electrical motors.

FIG. 22*c* schematically shows the vial gripper assembly 860. The main components of the vial gripper assembly are a motor 868, a load cell 870 to give an estimate of the amount of drug in the vial, and a vial gripper 866, which is adapted to connect to a vial adapter 864. In order to pick up a vial, the control system activates motors 848 and 852, to position vial gripper directly above the vial adapter 864 that is attached to vial 862, then it activates motor 856 to press the vial gripper 866 on a vial adaptor 864.

FIG. 22*d* schematically shows the syringe pump robotic arm assembly 838. Under direction of the software of the system syringe pump robotic arm assembly is configured to (1) move the syringe pump in order to remove an empty syringe from the syringe magazine; (2) to move the syringe to the proper location under working surface 816 (3) to connect the syringe to one of the vials (through the vial adaptor) in the vial flip mechanisms (4) to withdraw liquid from the vial; (5) to disconnect the syringe; (6) to move the filled syringe and connect it to an IV bag via a spike adaptor connected to it; (7) to wait until the syringe pump 36 is activated to inject the contents of the syringe into the IV bag; and (8) to repeat the process until the adequate dose has been injected to the IV bag and finally to move the empty syringe to and release it into a disposal bin. The syringe pump robotic arm assembly executes steps (1) to (8) mutatis mutandis in the cases when the prescription is delivered to the patient by infusion pump cartridge. In the case the drug is delivered to the patient by injecting it from a syringe, the syringe pump robotic arm assembly executes steps (1) to (4) and then connects the syringe to a Protective Plug on the IV bag base 826 and leaves it there i.e. releases its grip. The operator, then, pulls the Protective Plug out from its mount, with the syringe attached to it through a slot in the work surface 16 and carries the syringe with attached plug out of the safety cabinet through the open front of the safety cabinet above surface 816.

Syringe pump robotic arm assembly 838 is configured to pick up syringes and to move them to different stations under the work surface 816. The degrees of motion required to carry out these tasks are provided by x-axis motor and gear box 124 that, for example, turn a screw to move y-axis motor and gear box 128 in the x-direction along x-axis beam 130. Y-axis motor and gear box 128 turns a screw to move z-axis motor and gear box 132 in the y-direction along y-axis beam 130. Z-axis motor and gear box 132 moves syringe pump 36 up and down in the z-direction along z-axis beam 134.

FIG. 22*e* schematically shows the syringe pump 836. A syringe 122 is firmly attached to the housing 136 by means of syringe barrel gripper 144 and syringe bottom gripper 146. The plunger cap is secured in syringe plunger gripper 140. Syringe plunger gripper 140 can be moved up and down on pump rails 142 by means of a lead screw 138 that is rotated by a motor and gearbox inside housing 136; thereby drawing liquid into or ejecting it from the barrel of the syringe.

Much more commonly used in the art than closed transfer systems for hazardous drugs are open transfer systems for use with non-hazardous drugs. In open systems pressure equalization during a liquid transfer operation is accomplished by venting air to the surroundings if there is over-pressure in the system or allowing atmospheric air to be drawn inwards by under-pressure in the system.

Safety considerations and regulations for handling hazardous drugs require that the Equashield® system shall be of closed design with special components allowing closed operation, further, the components of the Equashield® closed drug transfer systems shall be manufactured from relatively expensive and difficult to handle materials to very strict tolerances. Therefore, although components produced for hazardous drugs can also be used for non-hazardous drugs, for the latter applications it would be desirable to provide components for an open transfer system that retain the advantages of the closed drug transfer system, i.e. simple, rapid, and secure handling and connection—both manually and using a robotic system.

It is a purpose of the present invention to provide components for an open transfer system that provide simple, rapid, and secure handling and connection.

It is another purpose of the present invention to provide components for an open transfer system that are configured to be used in a robotic system designed to assist a hospital pharmacy in the compounding and preparation for administration of medications comprising non-hazardous drugs.

Further purposes and advantages of this invention will appear as the description proceeds.

SUMMARY OF THE INVENTION

Presented herein, in a first aspect, is a robotic system for compounding and preparation of medications comprising non-hazardous drugs. The system comprises: a laminar flow cabinet; at least one robotic arm; and, at least one vented drug vial adapter. The vented drug vial adapter comprises a hydrophobic venting filter. The drug vial adapter and robotic system are configured to allow liquid to be drawn out of a drug vial and inserted into a drug vial.

Embodiments of the robotic system comprise: (i) at least two robotic arm assemblies configured to prepare syringes and intravenous (IV) bags comprising a prescribed amount of liquid drug for administration to patients according to their individual prescriptions by moving drug vials to which ventilated vial adapters have been connected and syringes within the laminar flow cabinet, (ii) cameras, and (iii) a system processor comprising software comprising imaging process algorithms that are adapted to provide real-time feedback control of all stages of the compounding process.

In embodiments of the robotic system the robotic arm assemblies are configured to move in three mutually orthogonal directions.

Embodiments of the robotic system comprise at least two robotic arm assemblies configured to move in three mutually orthogonal directions to prepare syringes and IV bags comprising the required amount of liquid drug for administration to patients according to their individual prescriptions by moving drug vials, to which ventilated vial adapters have been connected, and syringes, to which connector sections have been connected, within the laminar flow cabinet and cameras and a system processor comprising imaging process algorithms that are adapted to provide real-time feedback control of all stages of the compounding process. These embodiments are characterized in that:

- a) the connector sections each comprise one of:
  - (i) a septum holder comprising two resilient elongated arms that project vertically downwards parallel to each other attached to the side of the body part, each arm having distinctively shaped protrusions on the inner side of the distal ends of the arms; or
  - (ii) a securing actuator section comprising at least one rung formed on the inside wall of the connector section and at least one rotatable gear comprising sprockets peripherally arranged around the gear, a void portion configured to house an anchoring ledge, and a gap formed in the gear such that the void section is provided with an opening the orientation of which changes with the rotation of the gear;
- b) the ventilated drug vial adapters each comprise one of:
  - (i) an upwardly projecting portion comprising a membrane at a proximal end and sockets on an outside proximal end, the sockets having a shape and dimensions configured to match those of the distinctively shaped protrusions on the inside of the arms of the septum holder; or
  - (ii) an upwardly projecting portion comprising a membrane at a proximal end and anchoring ledges on an outside proximal end, the anchoring ledges having a shape and dimensions configured to pass through the gap and fit into the void in the gear of the securing actuator section of the connector.

As a result of these characterizing features the connector sections can be connected only to drug vials connected to ventilated vial adapters comprising compatible sockets or anchoring ledges on the outside surface.

In embodiments of the robotic system the distinctively shaped protrusions are on the outside of the upwardly projecting structure of the vial adapter and the matching sockets are on the inner side of the arms of the septum holder in the connector section and holder and on the distal end of the gripper assembly.

Embodiments of the robotic system comprise a spike adapter configured for connection to an intravenous (IV) bag. The spike adapter comprises:

a) a body terminating in a spike element at the proximal end of the body, the spike element comprising separate liquid and air channels;

b) a standard port for connecting an infusion set at the distal end of the body, the standard port in fluid communication with the air channel in the spike; and c) a longitudinal extension connected substantially at right angles to the body, the proximal end of the longitudinal extension comprising a membrane and configured to be coupled with the connector section, and the longitudinal extension comprising a liquid channel in fluid communication with the liquid channel in the spike.

The spike adapter is characterized in that the longitudinal extension comprises one of: (i) a socket having a shape and dimensions configured to match those of the distinctively shaped protrusions on the arms of the septum holder; or (ii) anchoring ledges having a shape and dimensions configured to pass through the gap and fit into the void in the gear of the securing actuator section of the connector section; thereby allowing the spike adapter to be connected only to a connector section that comprises either a septum holder comprising compatible protrusions or a securing actuator section comprising a compatible gap and void section.

In embodiments of the robotic system the cameras and software are configured to recognize the sockets, protrusions, the gaps, void portions and anchoring ledges and to warn the user if the wrong components are introduced into the cabinet; and, the robotic arm assemblies comprise mechanical features to insure that only the components compatible with an open transfer system are being used.

In embodiments of the robotic system the robotic arm assemblies configured to pick up, move, and release syringes comprise special mechanisms to grip the connector and the syringe in varying orientations and the system requires software configured to deal with various syringes and various orientations, identifying them and reading the right dosage; thereby allowing the system to use conventional syringes from various manufacturers and various shapes and dimensions.

Presented herein, in a second aspect, is an open liquid drug transfer system assembly comprising a first embodiment of a first embodiment of a ventilated vial adapter and a connector section; wherein, A) the connector section comprises:

a) a hollow outer body having a proximal end configured for connection to a conventional syringe and having an opening at its distal end configured to allow the proximal end of the ventilated vial adapter to be inserted for coupling;

b) one hollow needle that functions as a liquid conduit through the connector section; and c) one of:

(i) a septum holder comprising two resilient elongated arms that project vertically downwards parallel to each other attached to the side of the body part, each arm having distinctively shaped protrusions on the inner side of the distal ends of the arms; or (ii) a securing actuator section comprising at least one rung formed on the inside wall of the connector section and at least one rotatable gear comprising sprockets peripherally arranged around the gear, a void portion configured to house an anchoring ledge, and a gap formed in the gear such that the void section is provided with an opening the orientation of which changes with the rotation of the gear; and B) the first embodiment of ventilated vial adapter comprises:

a) a distal structure configured for attaching the vial adapter to a drug vial;

b) a spike element that projects downward inside the distal structure;

c) an upwardly projecting structure projecting upwards from the distal structure, the upwardly projecting portion comprising a membrane at its proximal end, the proximal end of the upwardly projecting structure adapted to be coupled to the connector section;

d) a liquid channel internally formed within the upwardly projecting structure and the spike element, the liquid channel configured to allow fluid communication through the vial adapter from openings at the tip of the spike to the proximally located membrane;

e) a hydrophobic filter located in the distal structure beneath the upwardly projecting structure; and f) an air channel internally formed within the vial adapter proximally of the hydrophobic filter and the spike element, the air channel configured to allow fluid communication through the vial adapter from openings at the tip of the spike to a vent hole located proximally to the hydrophobic filter to allow fluid communication between the air channel and the exterior of the vial adapter; and g) the upwardly projecting structure comprises one of:

(i) sockets on an outside proximal end, the sockets having a shape and dimensions configured to match those of the distinctively shaped protrusions on the inside of the arms of the septum holder; or (ii) an upwardly projecting portion comprising a membrane at a proximal end and anchoring ledges on an outside proximal end, the anchoring ledges having a shape and dimensions configured to pass through the gap and fit into the void in the gear of the securing actuator section of the connector.

The features of protrusions, sockets, gaps, and anchoring ledges allow the connector sections to be connected only to drug vials connected to a first embodiment the ventilated vial adapter comprising compatible sockets or anchoring ledges.

In embodiments of the open liquid drug transfer system assembly comprising the first embodiment of a ventilated vial adapter the distinctively shaped protrusions are on the outside of the upwardly projecting structure of the vial adapter and the matching sockets are on the inner side of the arms of the septum holder in the connector section.

Embodiments of the open liquid drug transfer system assembly comprising the first embodiment of a ventilated vial adapter additionally comprise a spike adapter configured for connection to an intravenous (IV) bag. The spike adapter comprises:

a) a body terminating in a spike element at the proximal end of the body, the spike element comprising separate liquid and air channels;
b) a standard port for connecting an infusion set at the distal end of the body, the standard port in fluid communication with the air channel in the spike; and
c) a longitudinal extension connected substantially at right angles to the body, the proximal end of the longitudinal extension comprising a membrane and configured to be coupled with the connector section, and the longitudinal extension comprising a liquid channel in fluid communication with the liquid channel in the spike.

The spike adapter is characterized in that the longitudinal extension comprises one of:
(i) a socket having a shape and dimensions configured to match those of the distinctively shaped protrusions on the arms of the septum holder; or
(ii) anchoring ledges having a shape and dimensions configured to pass through the gap and fit into the void in the gear of the securing actuator section of the connector section; thereby allowing the spike adapter to be connected only to a connector section that comprises either a septum holder comprising compatible protrusions or a securing actuator section comprising a compatible gap and void section.

In embodiments of the open liquid drug transfer system assembly the first embodiment of ventilated vial adapter is replaced with a second embodiment of ventilated vial adapter that comprises:
(a) a bottom part adapted to be attached to the head section of a medical vial or any type of vessel or device that has a head section similar to that of the head of a standard medicine vial;
(b) a top part comprising:
  (i) a disk shaped central piece and a plurality of wings adapted for facilitating securement of the top part to the bottom part, the wings attached to the circumference of the disk shaped central piece and projecting distally away from it;
  (ii) an upwardly projecting structure projecting upwards from the disk shaped central piece, the upwardly projecting structure adapted to be coupled to the connector section;
  (iii) a membrane that seals the proximal end of the upwardly projecting structure;
  (iv) a spike element which protrudes distally from the center of the disk shaped central piece;
  (v) an air channel and a liquid channel both of which are internally formed within the vial adapter proximally the hydrophobic filter and the spike element, the channels adapted to allow fluid communication through the vial adapter from the membrane that seals the proximal end of the upwardly projecting structure to openings at the tip of the spike;
(c) a first locking mechanism; and
(d) a second locking mechanism;
(e) an annular shaped flat hydrophobic filter located in the disk shaped central piece, beneath the upwardly projecting structure, the vial adaptor and the filter configured to allow liquid flowing in the liquid channel to pass through the vial adapter without passing through the filter and the filter located to intersect the air channel allowing air flowing through the air channel to pass through the filter and preventing liquid flowing through the air channel from passing through the filter;

wherein:
(i) the first locking mechanism is adapted to lock the top part to the bottom part such that the tip of the spike cannot contact a stopper in the head section when the head section is being attached to the bottom part and to release the top part from the bottom part after the bottom part has been attached to the head section;
(ii) the second locking mechanism is adapted to allow, after the bottom part has been attached to the head section, the spike to penetrate the stopper in the head section and to irremovably lock the top part to the bottom part;
(iii) the air channel above the filter comprises the entire interior volume of the upwardly projecting structure not occupied by the liquid conduit and a vent hole in the side of the upwardly projecting structure to allow fluid communication between the air channel and the exterior of the vial adapter; and
(iv) the upwardly projecting structure comprises one of:
  (a) a socket having a shape and dimensions configured to match those of the distinctively shaped protrusions on the arms of the septum holder; or
  (b) anchoring ledges having a shape and dimensions configured to pass through the gap and fit into the void in the gear of the securing actuator section of the connector section; thereby allowing the spike adapter to be connected only to a connector section that comprises either a septum holder comprising compatible protrusions or a securing actuator section comprising a compatible gap and void section.

In embodiments of the open liquid drug transfer system assembly comprising the second embodiment of ventilated vial adapter the distinctively shaped protrusions are on the outside of the upwardly projecting structure of the vial adapter and the matching sockets are on the inner side of the arms of the septum holder in the connector section.

Embodiments of the open liquid drug transfer system assembly comprising the second embodiment of ventilated vial adapter additionally comprise a spike adapter configured for connection to an intravenous (IV) bag. The spike adapter comprises:
a) a body terminating in a spike element at the proximal end of the body, the spike element comprising separate liquid and air channels;
b) a standard port for connecting an infusion set at the distal end of the body, the standard port in fluid communication with the air channel in the spike; and
c) a longitudinal extension connected substantially at right angles to the body, the proximal end of the longitudinal extension comprising a membrane and configured to be coupled with the connector section, and the longitudinal extension comprising a liquid channel in fluid communication with the liquid channel in the spike;

the spike adapter characterized in that the longitudinal extension comprises one of:
  (i) a socket having a shape and dimensions configured to match those of the distinctively shaped protrusions on the arms of the septum holder; or
  (ii) anchoring ledges having a shape and dimensions configured to pass through the gap and fit into the void in the gear of the securing actuator section of the connector section;

thereby allowing the spike adapter to be connected only to a connector section that comprises either a septum holder comprising compatible protrusions or a securing actuator section comprising a compatible gap and void section.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

For more than a decade the applicant of the present application has been engaged in development, manufacture, and sales of components of closed system liquid transfer devices designed to provide contamination-free transfer of hazardous drugs. These products are used to reconstitute powdered drugs and to transfer hazardous drugs in liquid form between drug vials, syringes, and IV bags. Some of the products developed and a robotic system that utilizes them for automatic preparation of prescriptions are described in the background section of this application. The present invention relies on the work done to date on the components for closed systems to develop similar components for use in the preparation of prescriptions involving non-hazardous drugs.

Drugs are supplied by the manufacturers in vials as either liquids or powders. If in powder form then it must be reconstituted by addition of a measured amount of liquid diluent to the interior of the vial. In either case the preparation of a prescription involves drawing a measured amount of liquid drug from a vial into a syringe.

Figure 15A:
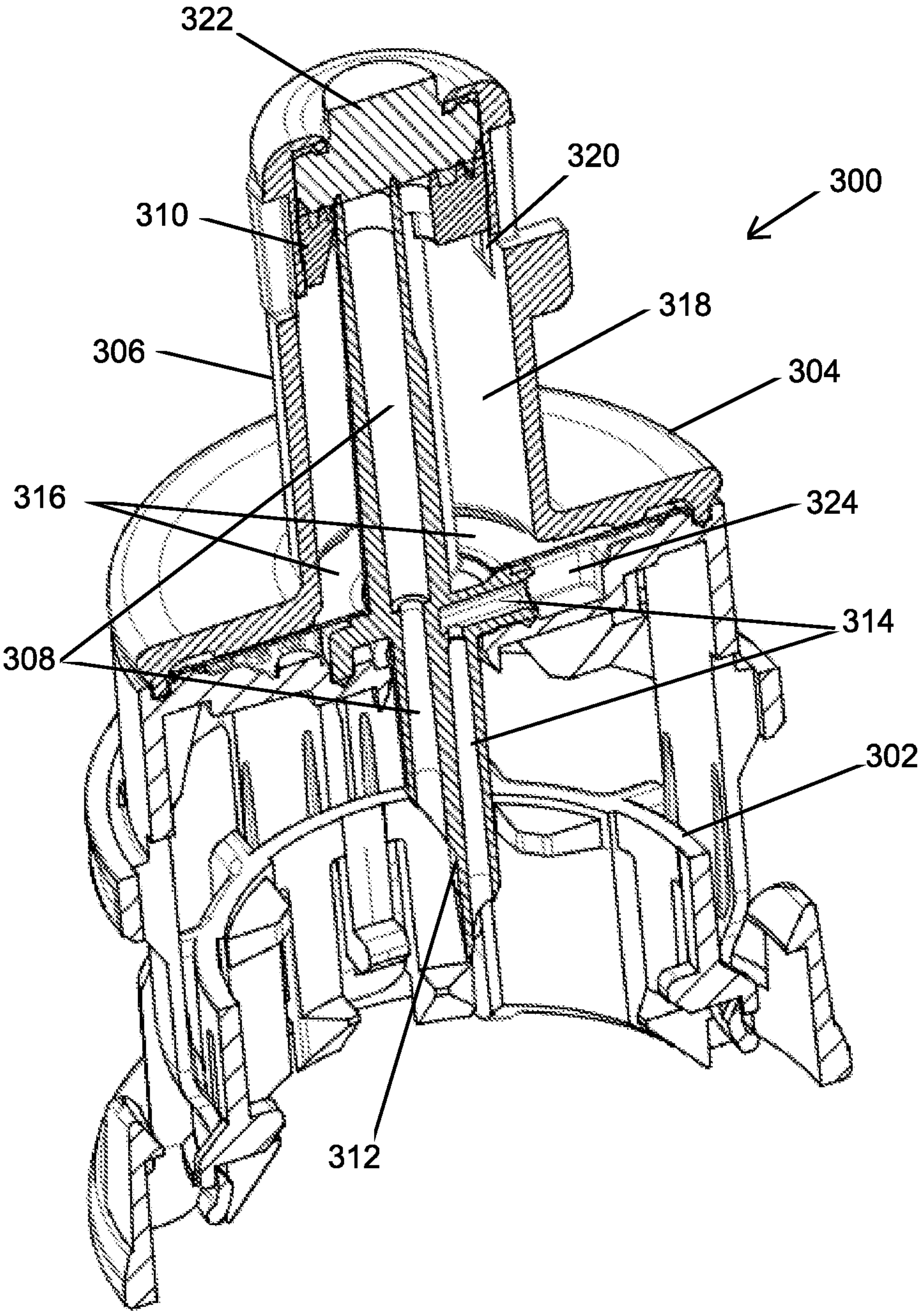
FIG. 15*a* is a cross-sectional view schematically showing a vial adapter that is adapted for use in an open transfer system.

FIG. 15*a* is a cross-sectional view schematically showing a vial adapter 300 that is adapted for use in an open transfer system. Vial adapter 300 comprises two parts a top part 304 and a bottom part 302. The structure of these two parts of vial adapter 300 and the telescopic way in which they lock together when connected to a drug vial is similar in most respects to the corresponding parts of vial adapter 200 described herein above with relation to FIG. 5*a* to FIG. 12.

In contrast to the closed system vial adapter 200, the vial adapter 300 comprises only one conduit—liquid conduit 308—that passes through the entire vial adapter from the bottom of septum 322, which rests on septum seat 310 and seals the top of the vial adapter, through upwardly projecting structure 306, to the tip of spike 312.

Figure 4:
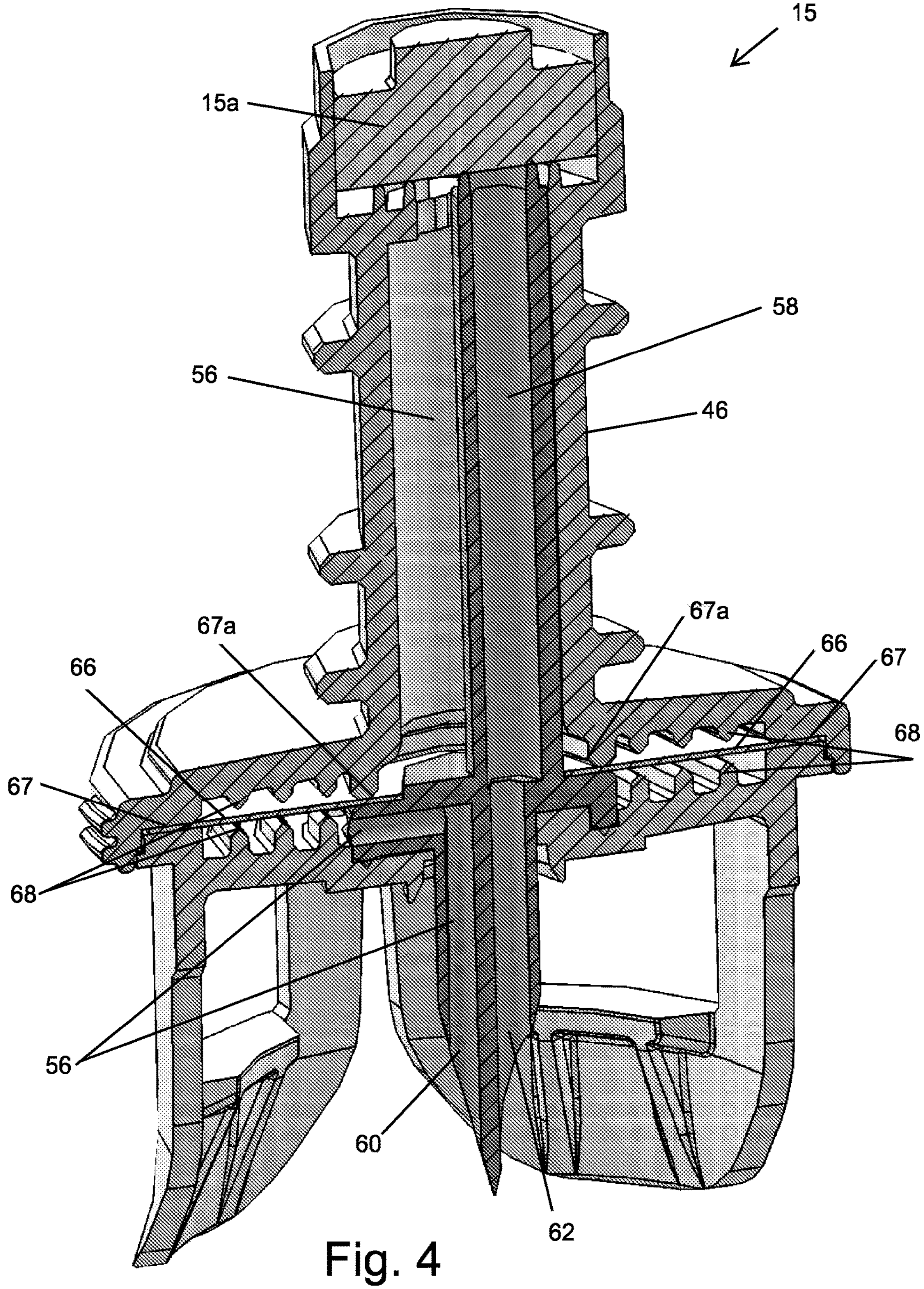
Fig. 4 Prior Art
FIG. 4 is a cross-sectional view of the prior art vial adapter of FIG. 2 and FIG. 3 modified to comprise a hydrophobic filter membrane.
Figure 5B:
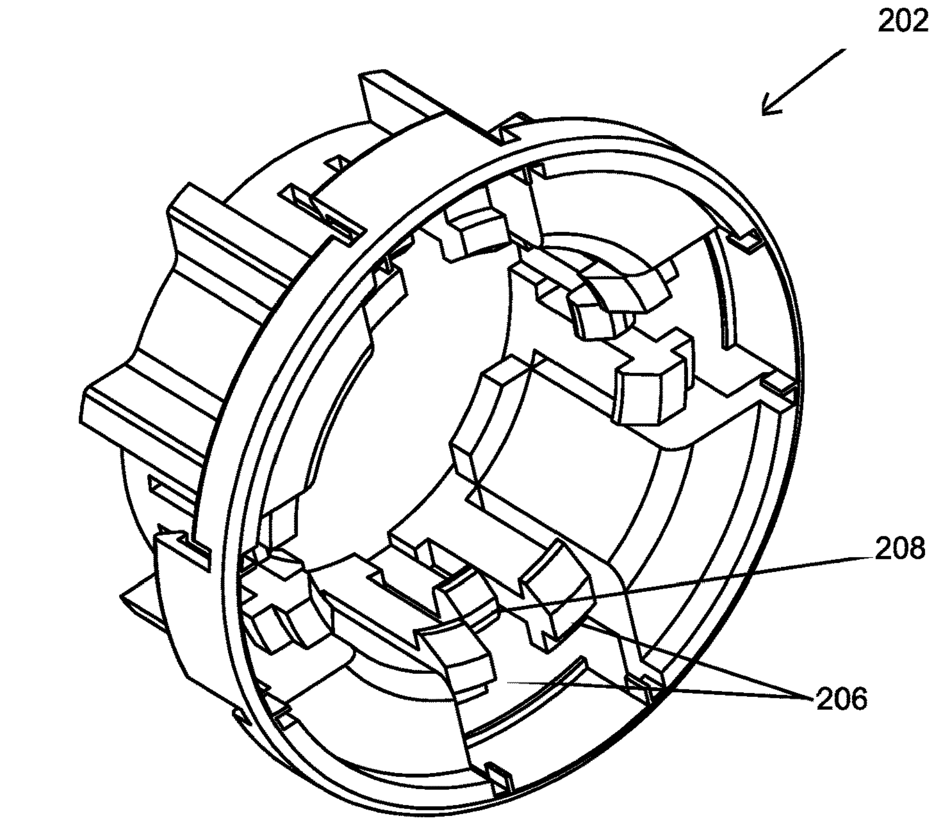
Fig. 5b Prior Art
FIG. 5*a* to FIG. 12 are different views showing another embodiment of a prior art vial adapter that is designed to be a part of an apparatus for transferring hazardous drugs without contaminating the surroundings.
Figure 5A:
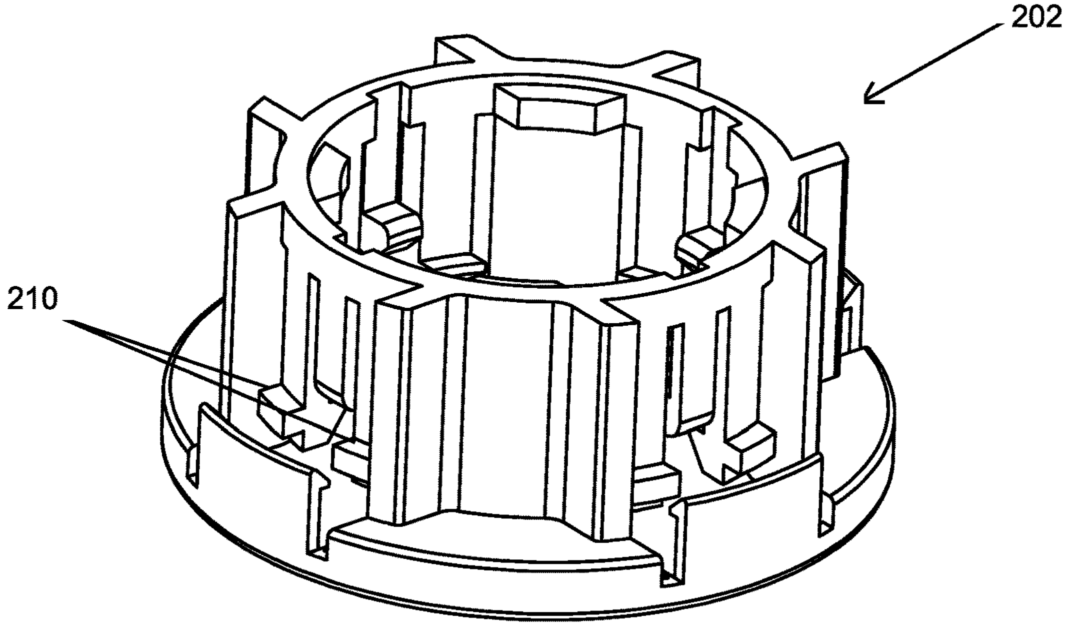
Fig. 5a Prior Art
Figure 6:
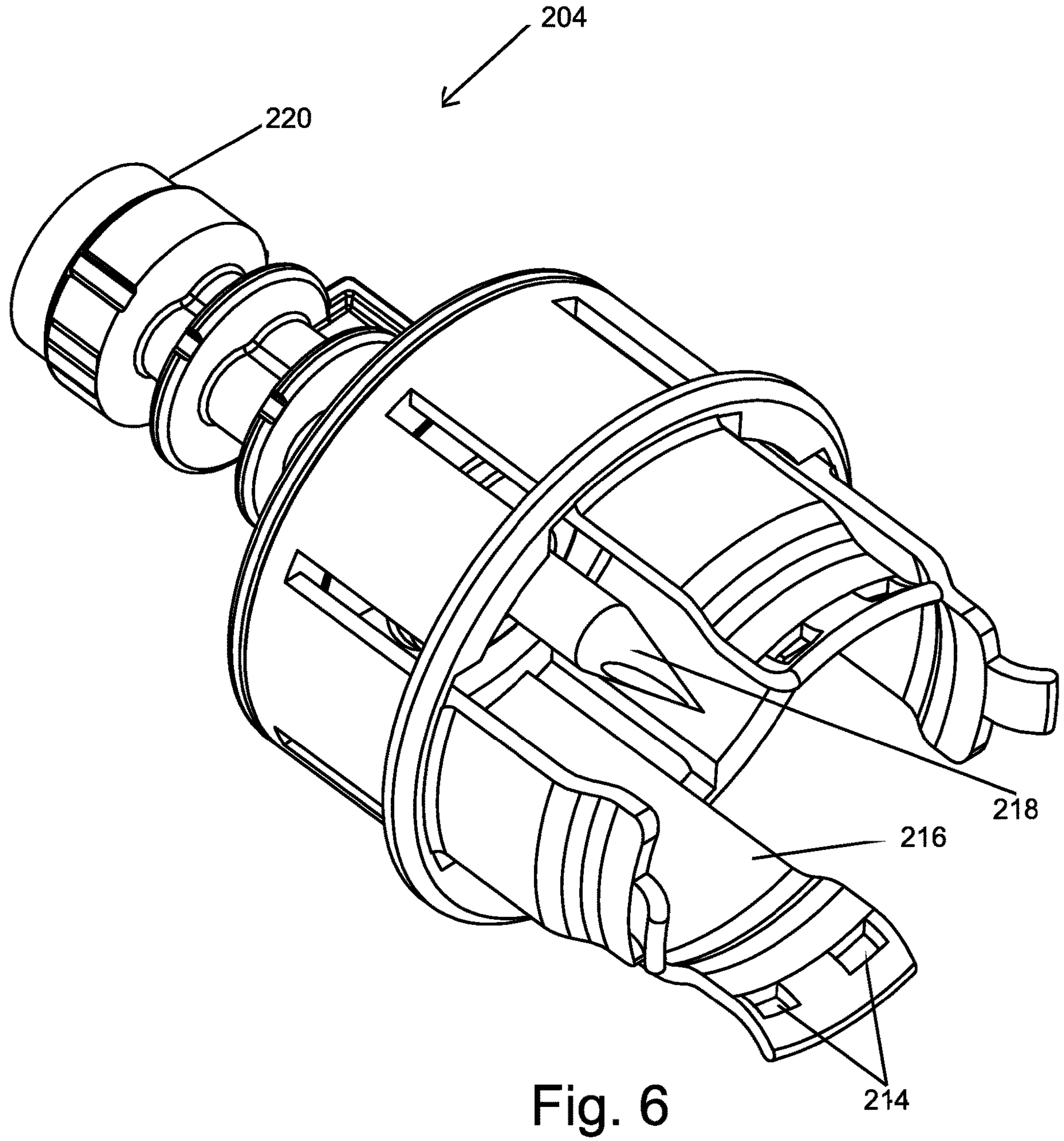
Fig. 6 Prior Art
Figure 7B:
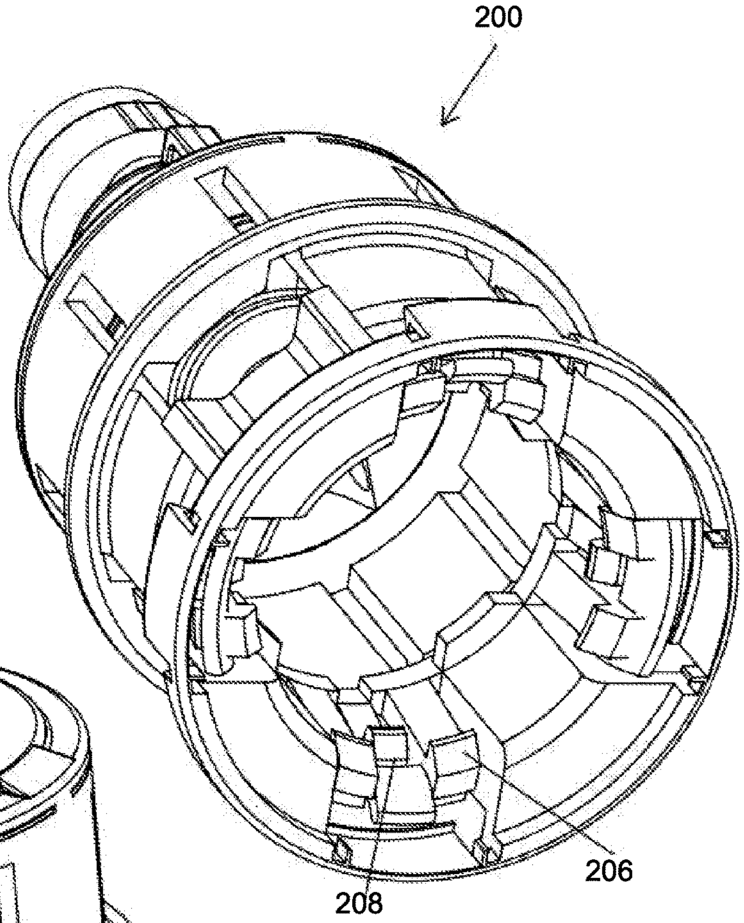
Fig. 7b Prior Art
Figure 7A:
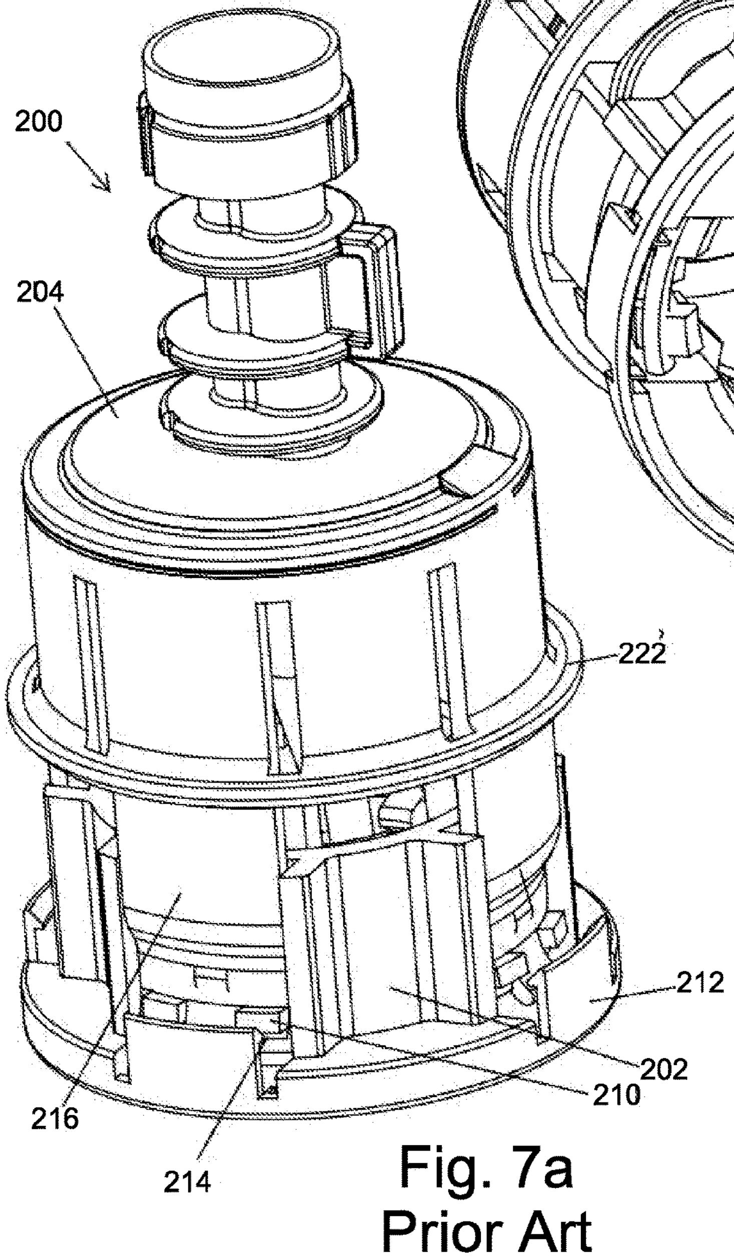
Fig. 7a Prior Art
Figure 8:
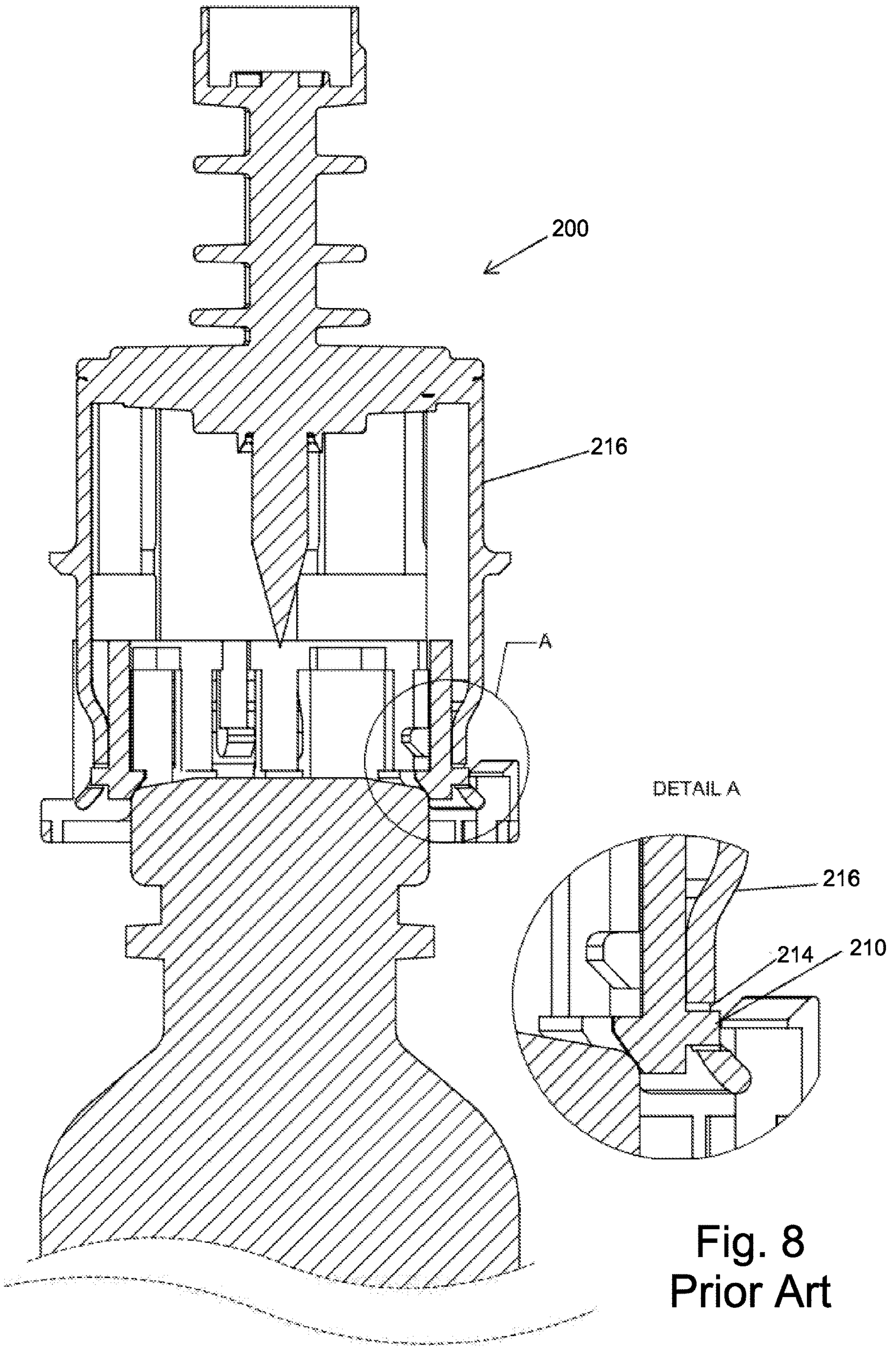
Fig. 8 Prior Art
Figure 9:
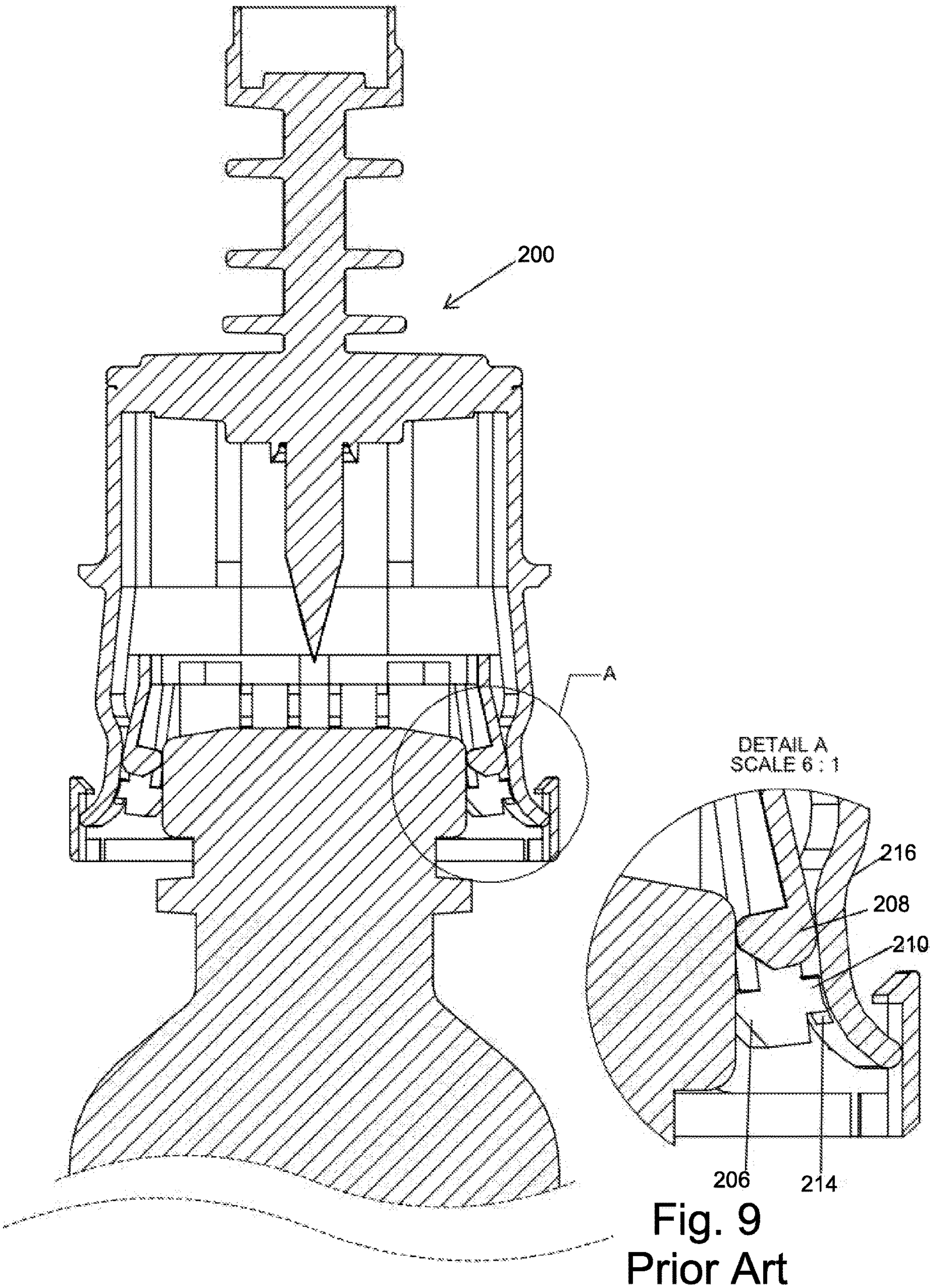
Fig. 9 Prior Art
Figure 10:
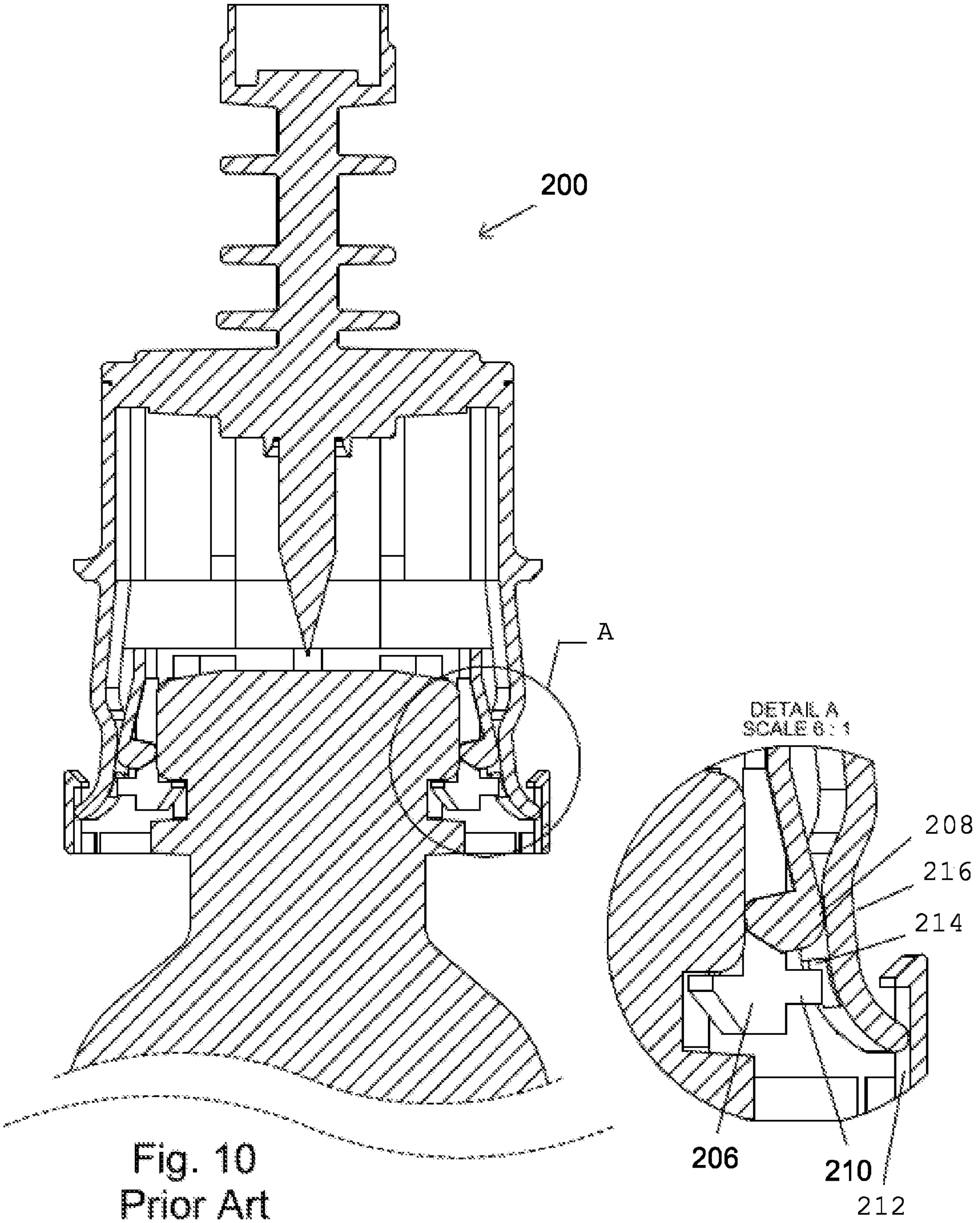
Fig. 10 Prior Art
Figure 11:
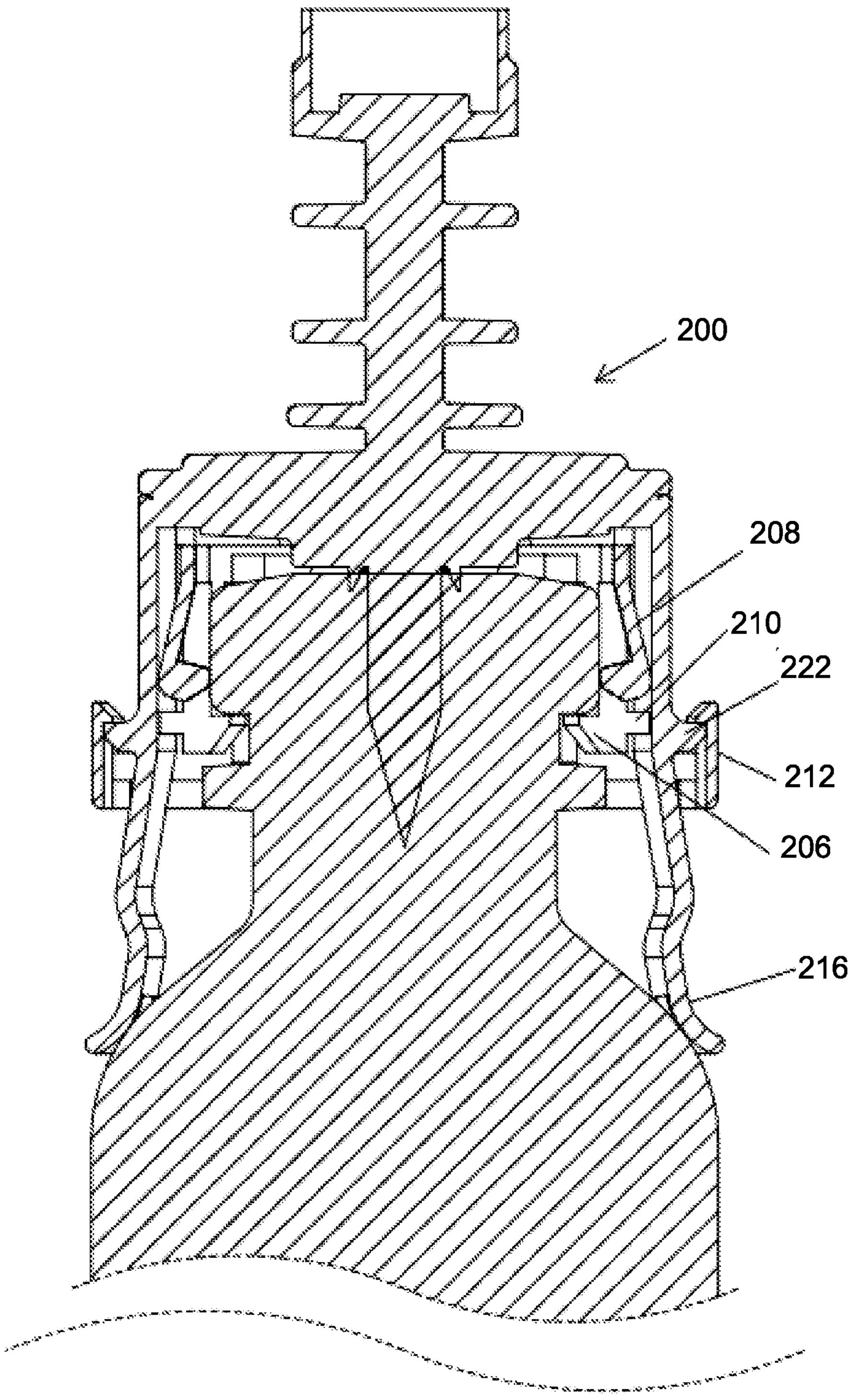
Fig. 11 Prior Art
Figure 12:
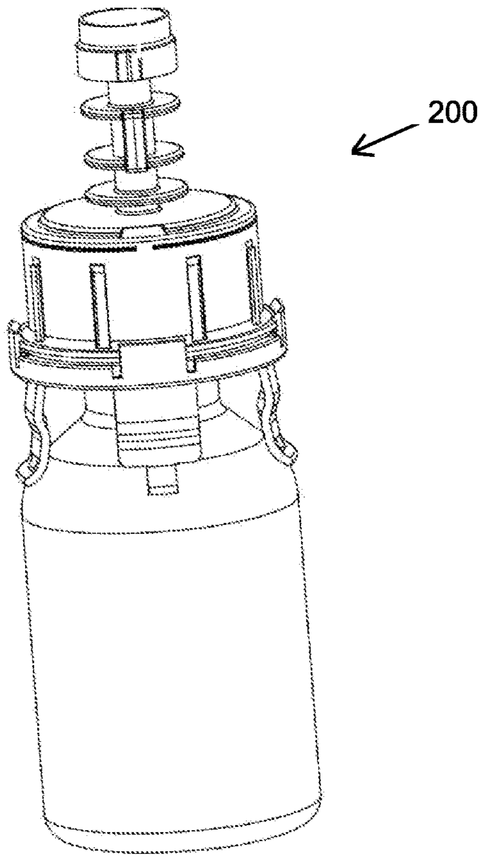
Fig. 12 Prior Art
Figure 13:
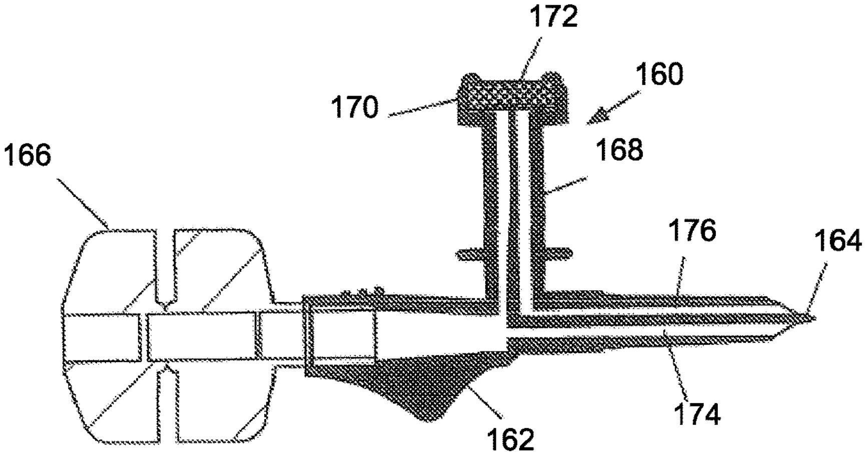
Fig. 13 Prior Art
FIG. 13 is a cross sectional view showing a prior art spike adapter used in conjunction with fluid transfer apparatus and connector section to transfer a drug to and from an intravenous (IV) bag.

Vial adapter 300 comprises a hydrophobic filter 316. The filter is made of a thin disc shaped piece of hydrophobic material. A hole is cut through it to allow free passage of liquid through liquid conduit 308. The filter 316 is placed between a plurality of closely spaced supporting ribs from above and below and its outer and inner edges are welded, glued, or mechanically pressed to the top part 304 of vial adapter as described herein above with respect to FIG. 4.

An air channel 314 through the spike terminates in an open space 324 beneath filter 316. The interior of the upwardly projecting structure 306 comprises a hollow air chamber 318 surrounding liquid conduit 308. Air chamber 318 is sealed at the top by septum 322 and at the bottom sealed to prevent the entrance of liquid by filter 316. A vent hole 320 near the top in the side of upwardly projecting structure 306 above filter 316 allows fluid communication between the interior of air chamber 318 and the air outside of the vial adapter.

Figure 15B:
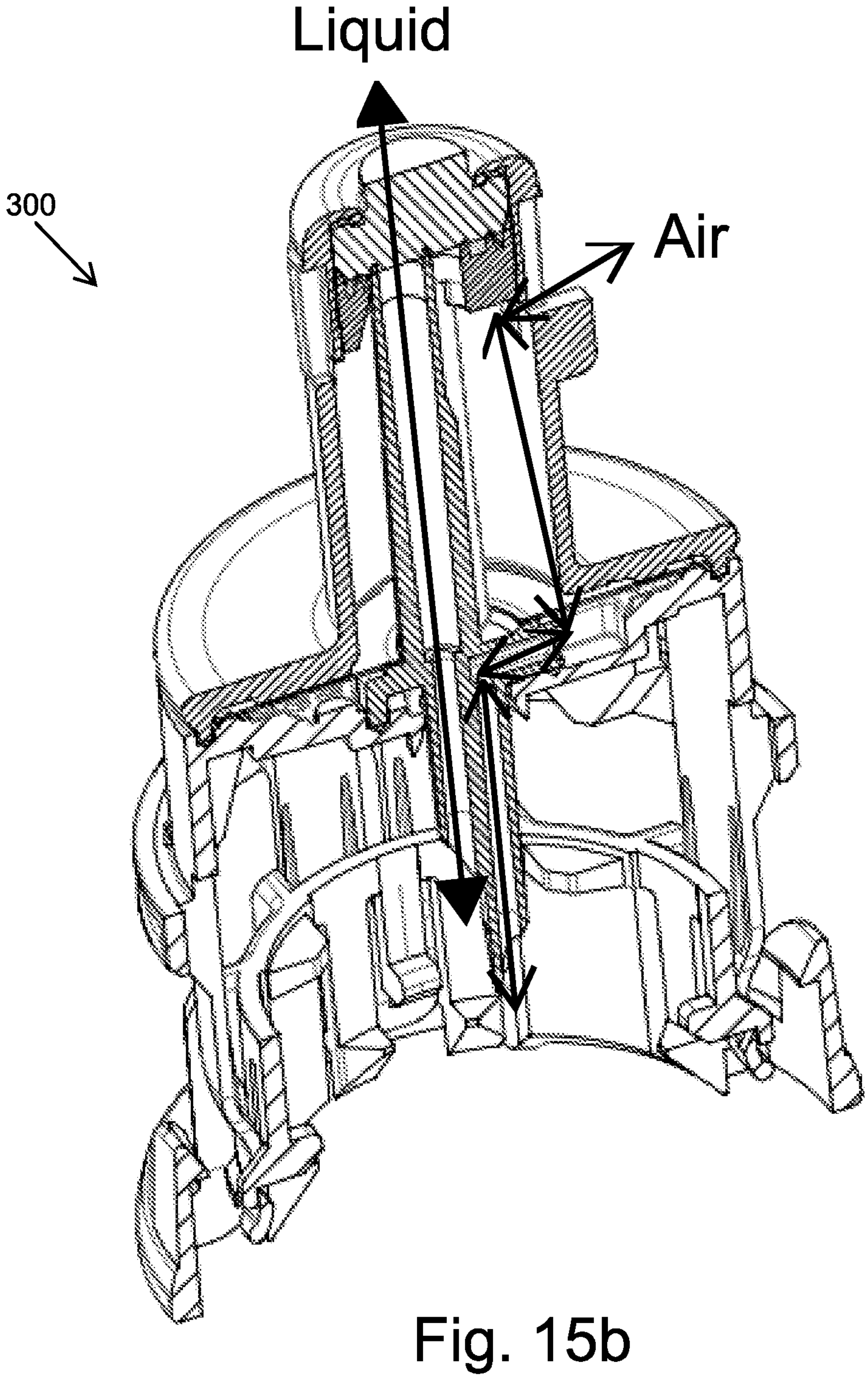
FIG. 15*b* schematically shows the paths of two-directional flows of liquid and air through the vial adapter of FIG. 15*a;*

FIG. 15*b* schematically shows the paths of two-directional flows of liquid and air through the vial adapter of FIG. 15*a*.

Figure 16B:
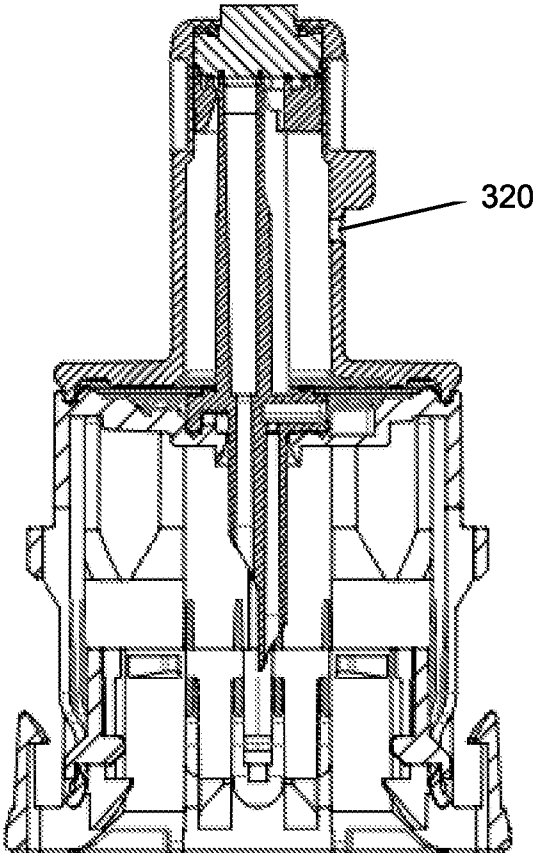
FIG. 16*a* and FIG. 16*b* show alternative locations for the vent hole in the vial adapter of FIG. 15.
Figure 16A:
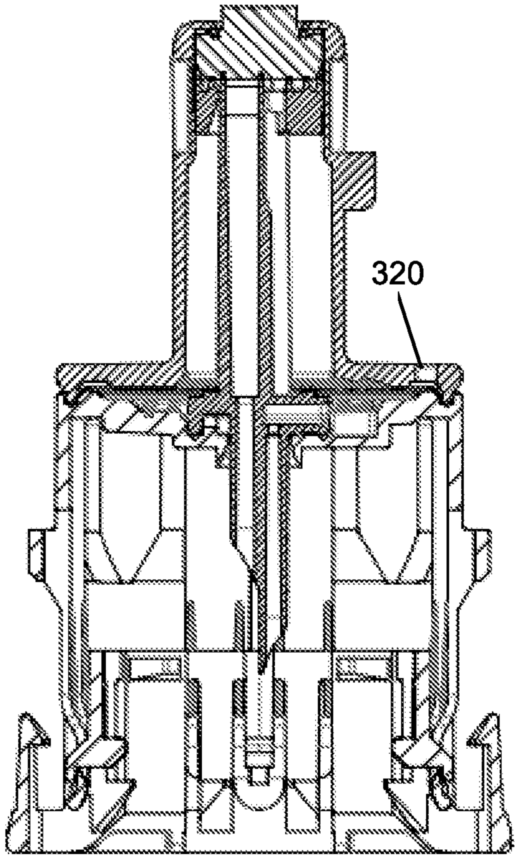

FIG. 16*a* and FIG. 16*b* show alternative locations in vial adapter 300 for the vent hole 320, which can be located at any place proximally, i.e. above or beyond, filter 316. A person skilled in the art can place and shape the venting feature in various places and ways.

Figure 17:
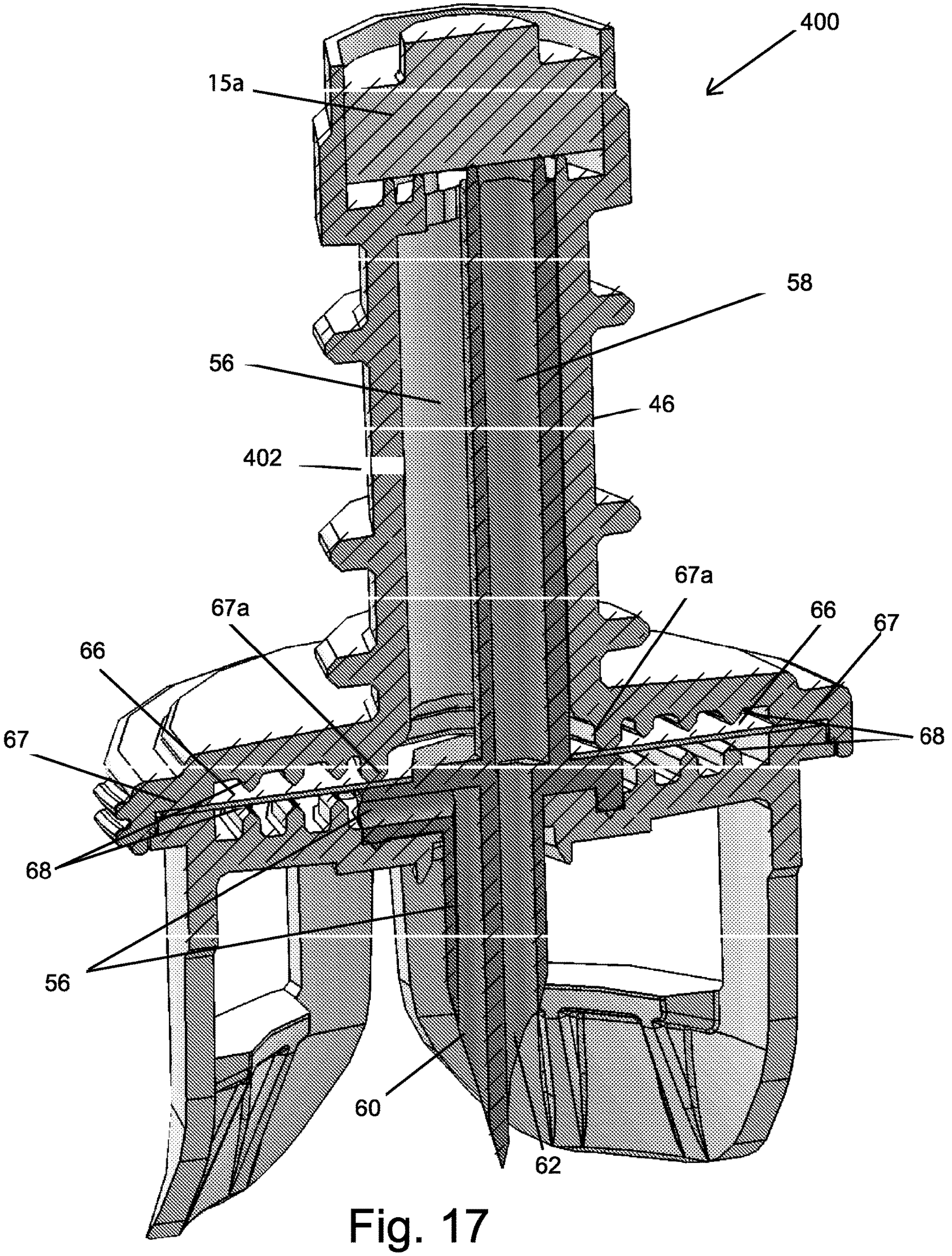
FIG. 17 shows another embodiment of vial adapter designed for use with an open transfer system.

FIG. 17 shows another embodiment of vial adapter designed for use with an open transfer system. It is identical to vial adapter 15 shown in FIG. 4 with the exception that the air channel 56 has a vent hole 402 in its side that allows unhindered fluid communication between the interior of air channel 56 and the exterior of vial adapter 400. Vent hole 402 is located above filter 66. Pressure equalization takes place in vial adapter 400 exactly as described for vial adapter 300 described with reference to FIG. 15*a* and FIG. 15*b*.

Figure 18A:
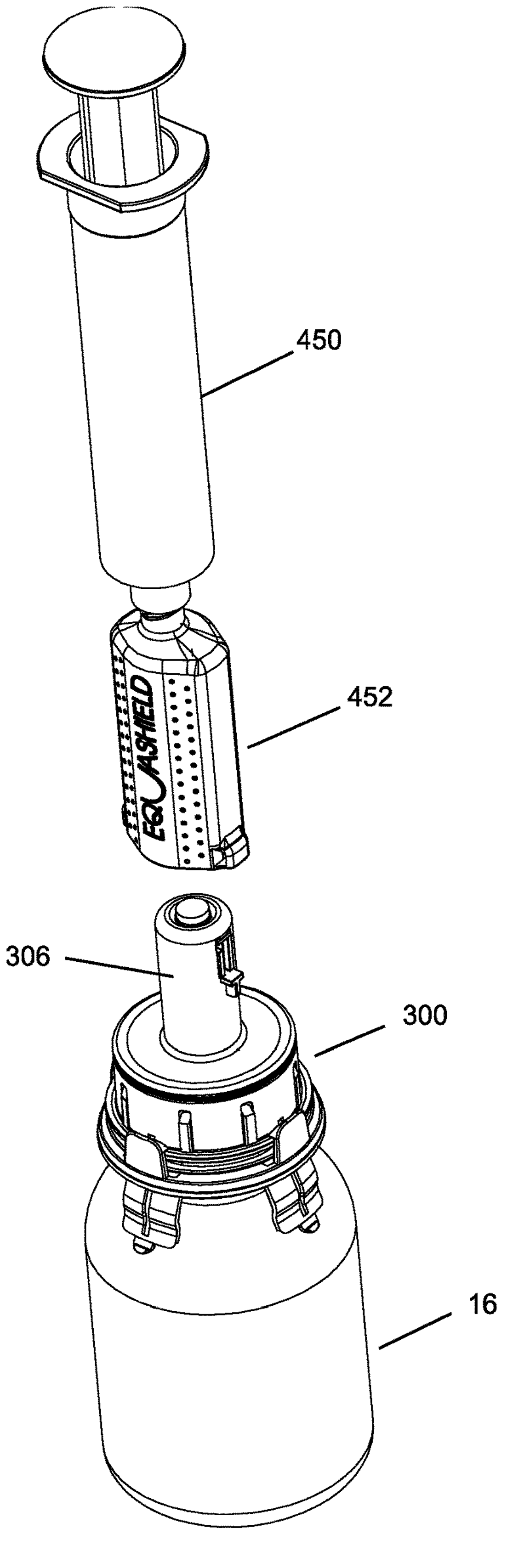
FIG. 18*a* shows an open transfer system partially assembled for use.

FIG. 18*a* shows an open transfer system partially assembled for use. The system comprises a vial adaptor 300 (see FIG. 15*a*) that is attached to a drug vial 16 and a conventional syringe 450 that is attached to an open system connector 452.

Figure 18B:
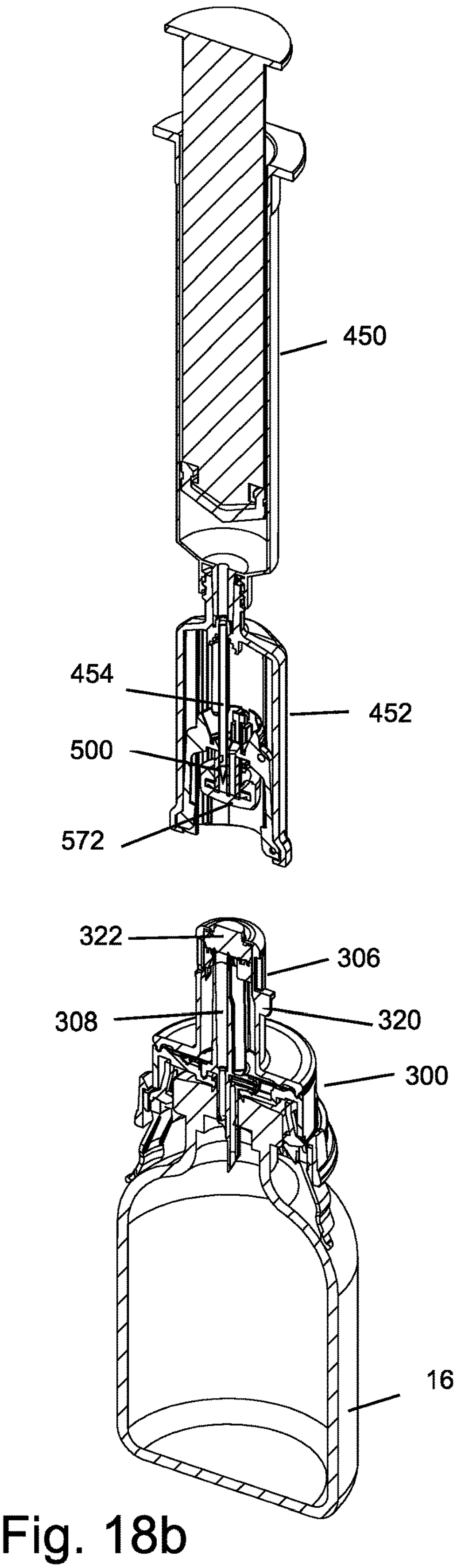
FIG. 18*b* shows a cross-sectional view of the open transfer system of FIG. 18*a* in its blocked configuration.

FIG. 18*b* shows the cross-sectional view of the open transfer system of FIG. 18*a*. Shown in FIG. 18*b* are: conventional syringe 450, connector 452, and vial 16 with attached vial adapter 300.

Also shown are upwardly projecting structure 306, septum 322, liquid channel 308, and vent hole 320 of vial adapter 300.

Figure 1A:
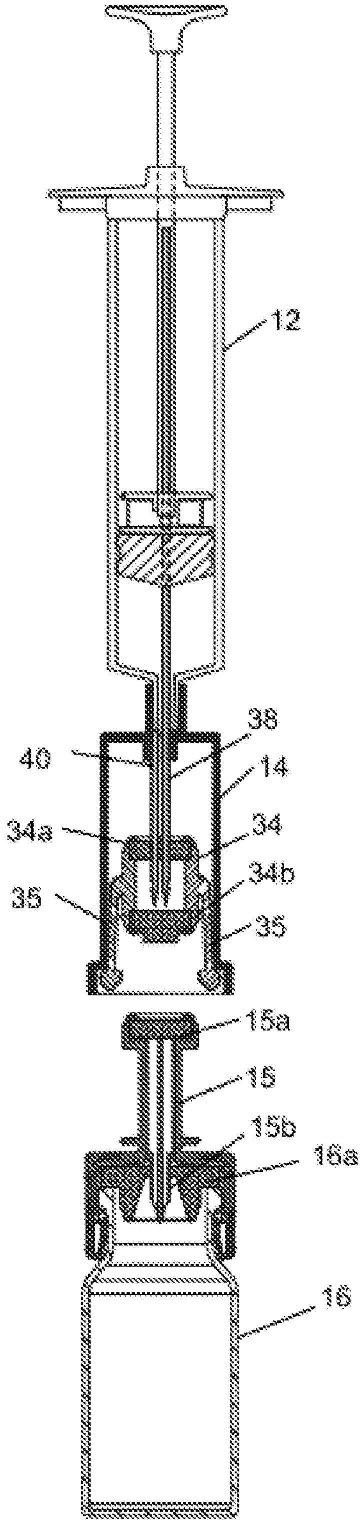
Fig. 1a Prior Art
FIG. 1*a* and FIG. 1*b* are schematic cross-sectional views of a prior art apparatus for transferring hazardous drugs without contaminating the surroundings.
Figure 1B:
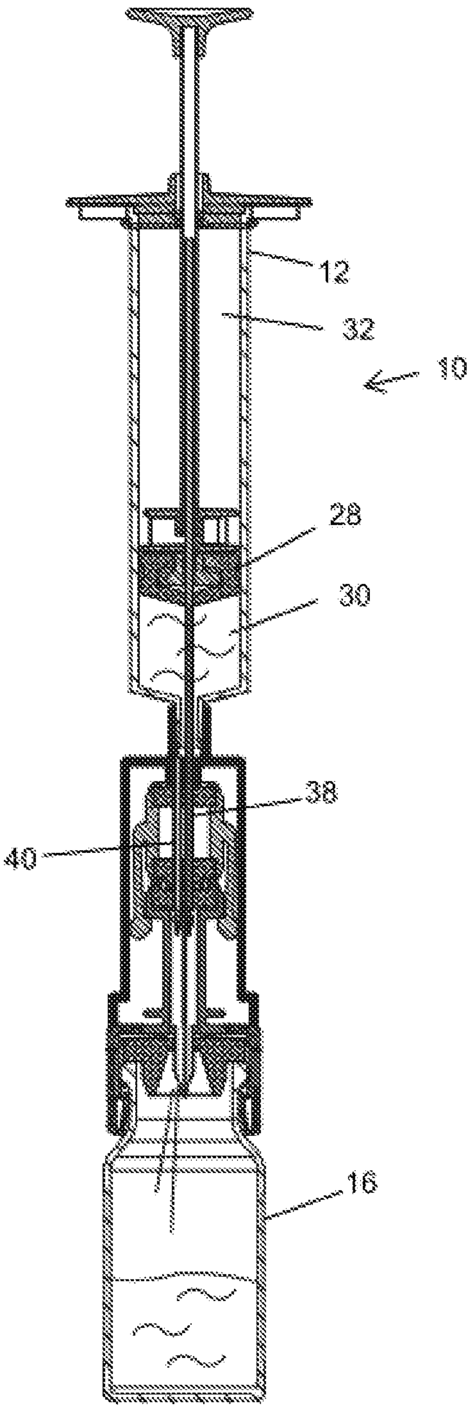
Fig. 1b Prior Art
Figure 3:
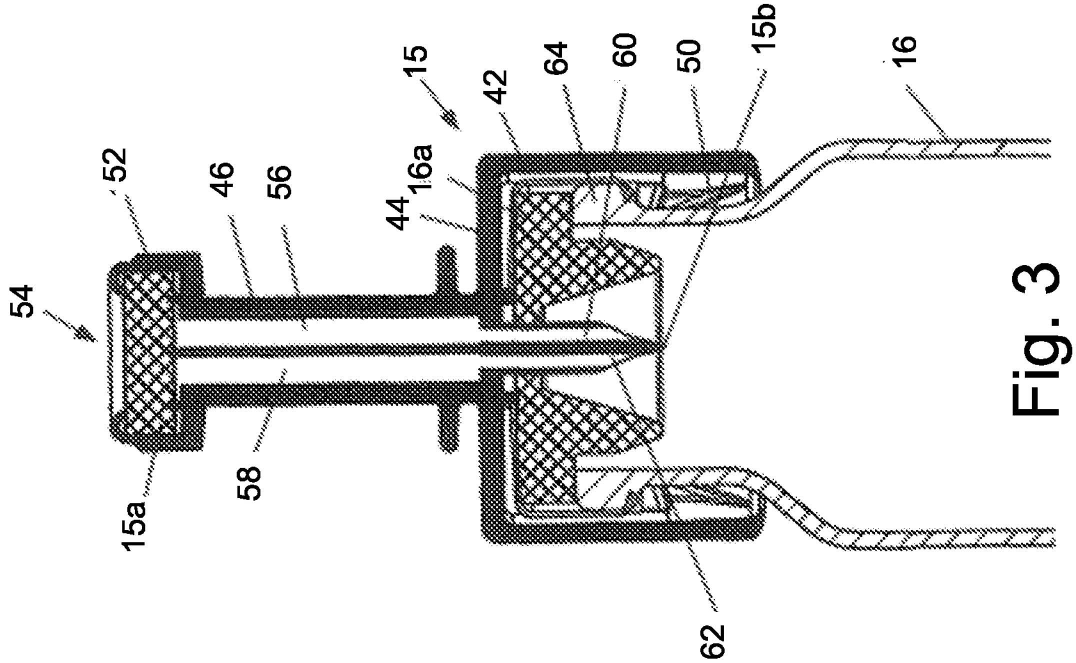
Fig. 3 Prior Art
FIG. 2 and FIG. 3 show respectively a perspective view and a cross sectional view of a prior art vial adapter that is designed to be a part of an apparatus for transferring hazardous drugs without contaminating the surroundings.
Figure 2:
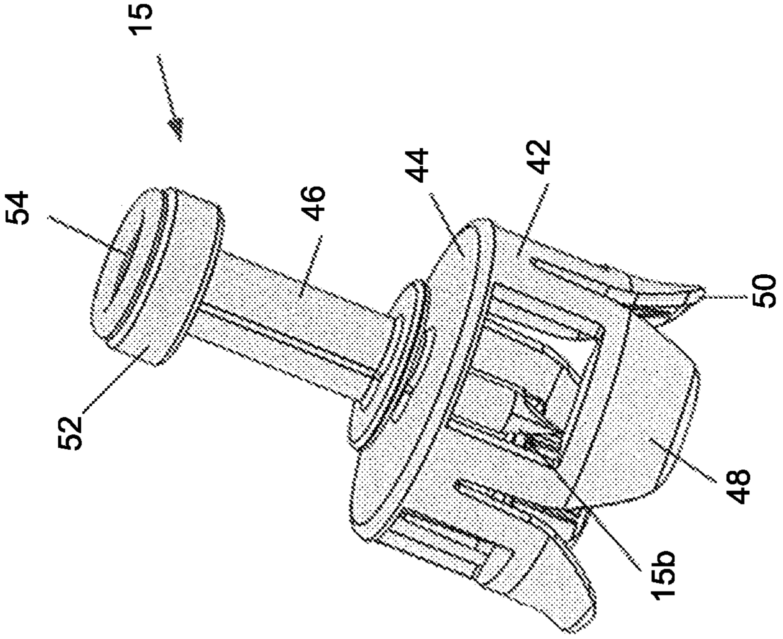
Fig. 2 Prior Art
Figure 18C:
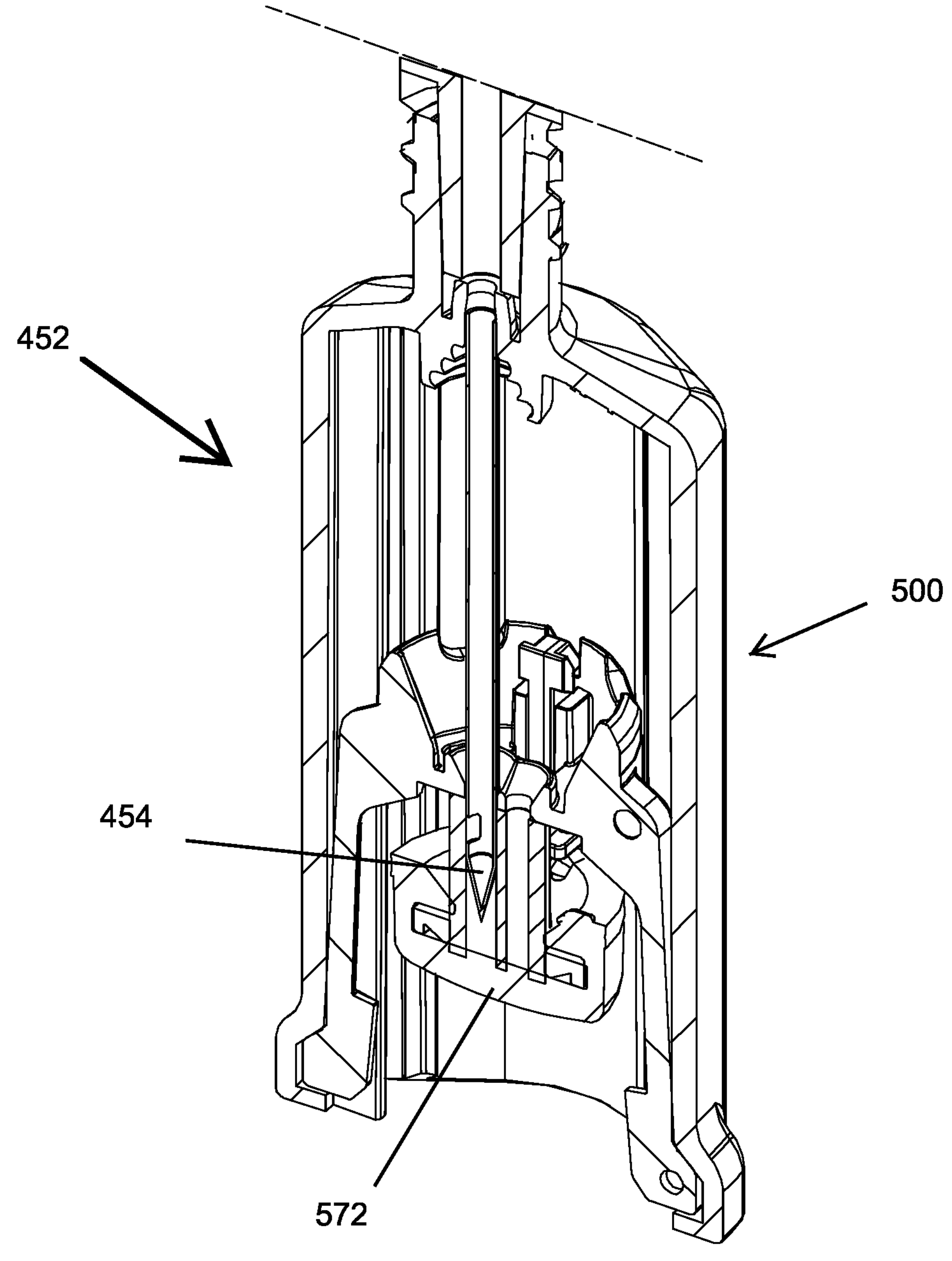
FIG. 18*c* shows a connector section in the open transfer system of FIG. 18*a;*

FIG. 18*c* shows connector 452, which is similar to the prior art connector section 14 with the following modifications: (a) the double membrane seal actuator 34 shown in FIG. 1*a* is replaced with a septum holder 500 (shown in FIG. 14) comprising septum 572 at its bottom; and (b) there is only one needle 454 acting as a liquid conduit within connector 452. Connector 452 is shown in its blocked configuration.

Figure 19A:
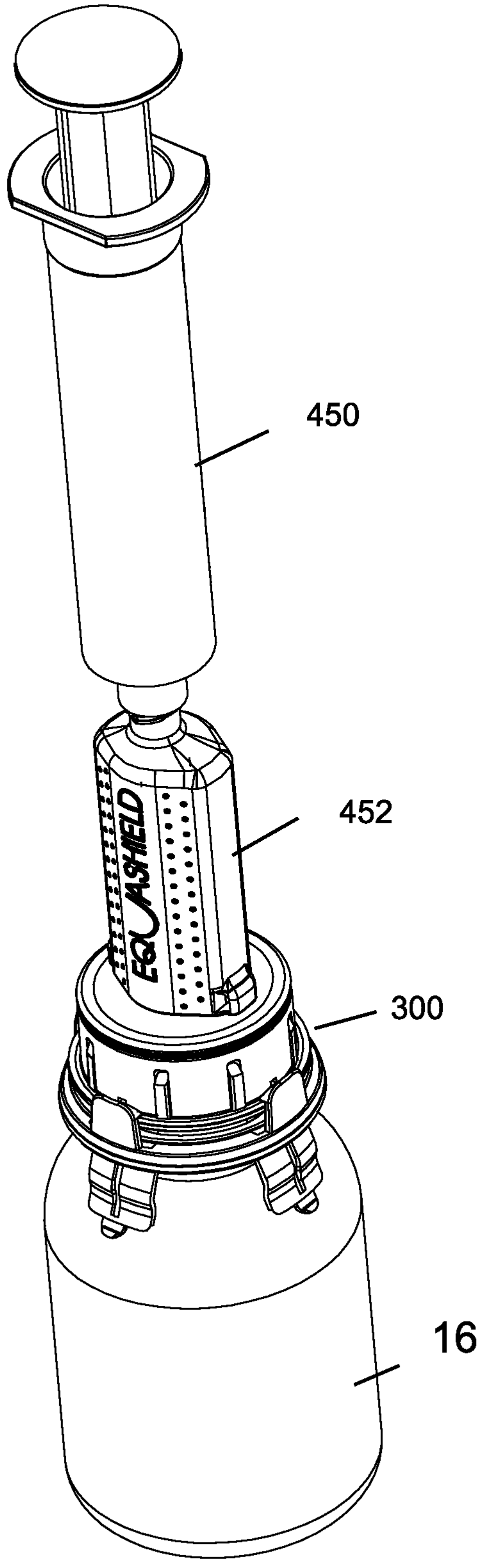
FIG. 19*a* shows the open transfer system of FIG. 18*a* in its fully assembled configuration for transfer of fluids.

FIG. 19*a* shows the open transfer system of FIG. 18*a* in its fully assembled configuration after vial adapter 300 is connected to a drug vial and spike 312 has penetrated the membrane at the top of the vial as described herein above with reference to FIGS. 8-11. The vial adaptor 300 with attached drug vial 16 is connected to the conventional syringe 450 by means of connector 452.

Figure 19B:
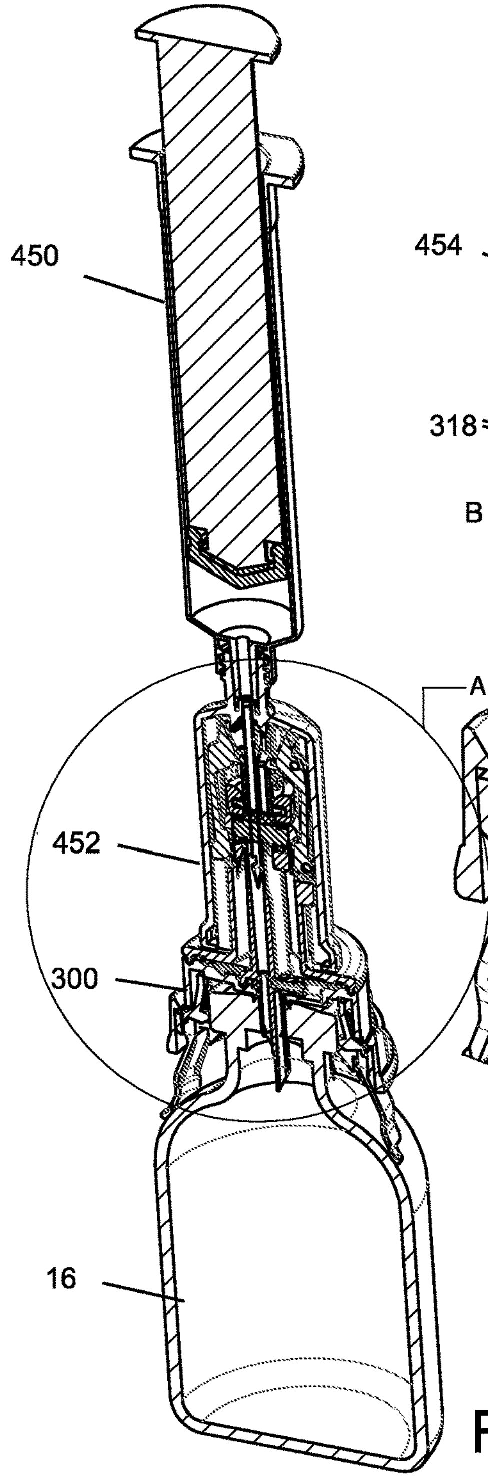
FIG. 19*b* is a cross-sectional view of the open transfer system of FIG. 19*a;*

FIG. 19*b* is the cross-sectional view of the open transfer system of FIG. 19*a*. The FIG. 19*c* is a zoom-in of section A in FIG. 19*b* focusing on the vial adaptor with the connected syringe connector.

Figure 19C:
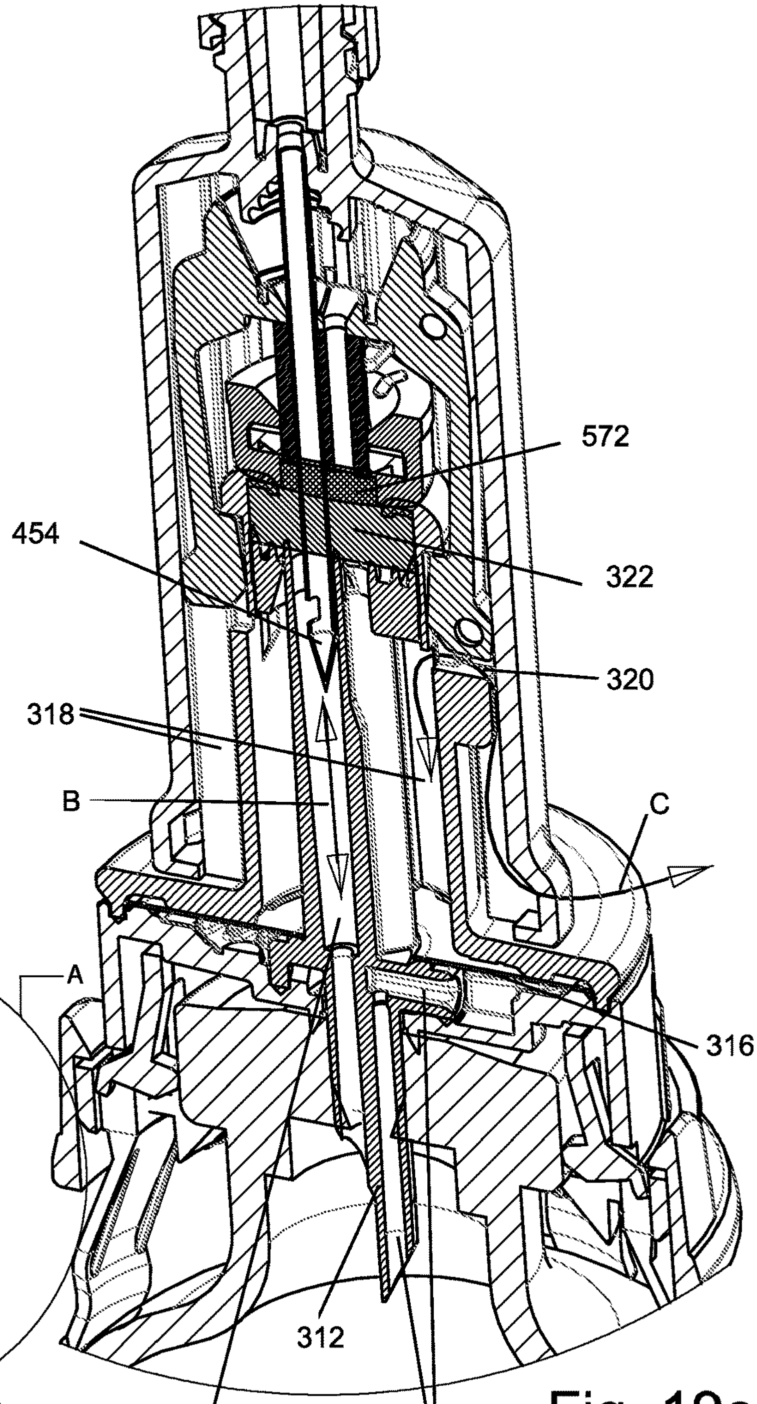
FIG. 19*c* is a zoom-in of section A in FIG. 19*b* focusing on the vial adaptor and the connected syringe connector.

Using the open transfer system shown in FIGS. 18*a*-19*c*, a drug in powdered form can be reconstituted by filling a conventional syringe 450 with the required amount of diluent, the syringe connector 452, which is connected to the syringe, is then pushed down over the upwardly projecting structure 306 of the open system vial adapter (FIGS. 18*a* and 18*b*) until the connection is established as shown in FIGS. 19*a* through 19*c* at which time the needle 454 of the connector 452 has penetrated through both the septum 572 of the septa holder in connector 452 and the septa 322 of the vial adaptor and has entered liquid conduit 308 in the vial adapter.

After the connection is established the piston of the syringe 450 can be pushed downward forcing the liquid diluent to flow through needle 454 in the connector and liquid conduit 308 in the vial adapter into the interior of the vial (arrow B). As liquid enters the vial air is displaced and pressure is equalized by air flowing out of the vial through air channel 314 through hydrophobic filter 316 into air chamber 318 and out of the vial adapter through vent hole 320 (arrow C).

To draw liquid out of a drug vial the connected vial and syringe connected as shown in FIGS. 19*a*-19*c* are flipped and inverted upside down so that the vial is located above the syringe. Following the inversion the piston of the syringe can be pulled downward drawing the liquid out of the interior of the vial through liquid conduit 308. As the liquid is drawn out of the vial a partial vacuum is created in the vial, which is equalized by suction which draws air into the vial from outside of vial adapter 300 through vent hole 320, air chamber 318, filter 316, and air channel 314.

As mention above, the components of the closed systems can be used when compounding and filling prescriptions of hazardous and non-hazardous drugs; however the components of the open systems can be used only for non-hazardous drugs. In order to prevent interchangeability of the open and closed system components the applicant uses a different configuration of connecting elements to connect the components of each system.

Figure 20A:
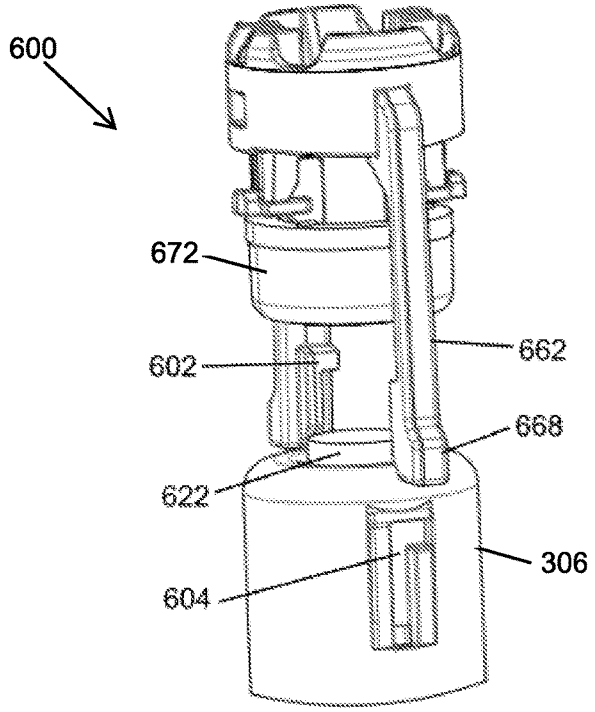
FIG. 20*a* and FIG. 20*b* schematically illustrate the elements that allow connecting together two components of an open transfer system and prevent an open transfer component from connecting with a closed transfer component.
Figure 20B:
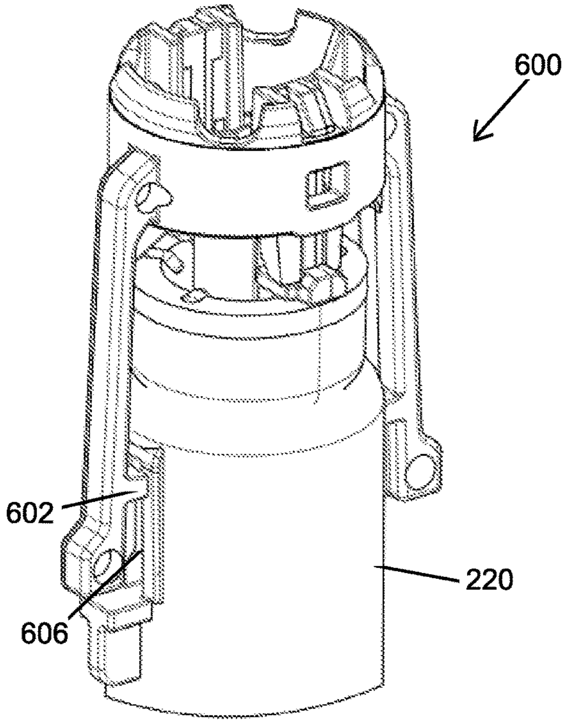

FIG. 20*a* and FIG. 20*b* schematically illustrate the elements that allow connecting together two components of an open transfer system and prevent an open transfer component from connecting with a closed transfer component. For illustrative purposes an open system septum holder 600, which is a component of a connector section, is to be connected to the upwardly projecting structure 306 of an open system vial adapter (see FIG. 15*a*) and the upwardly projecting structure 220 of a closed system vial adapter (see FIG. 6).

Figure 14:
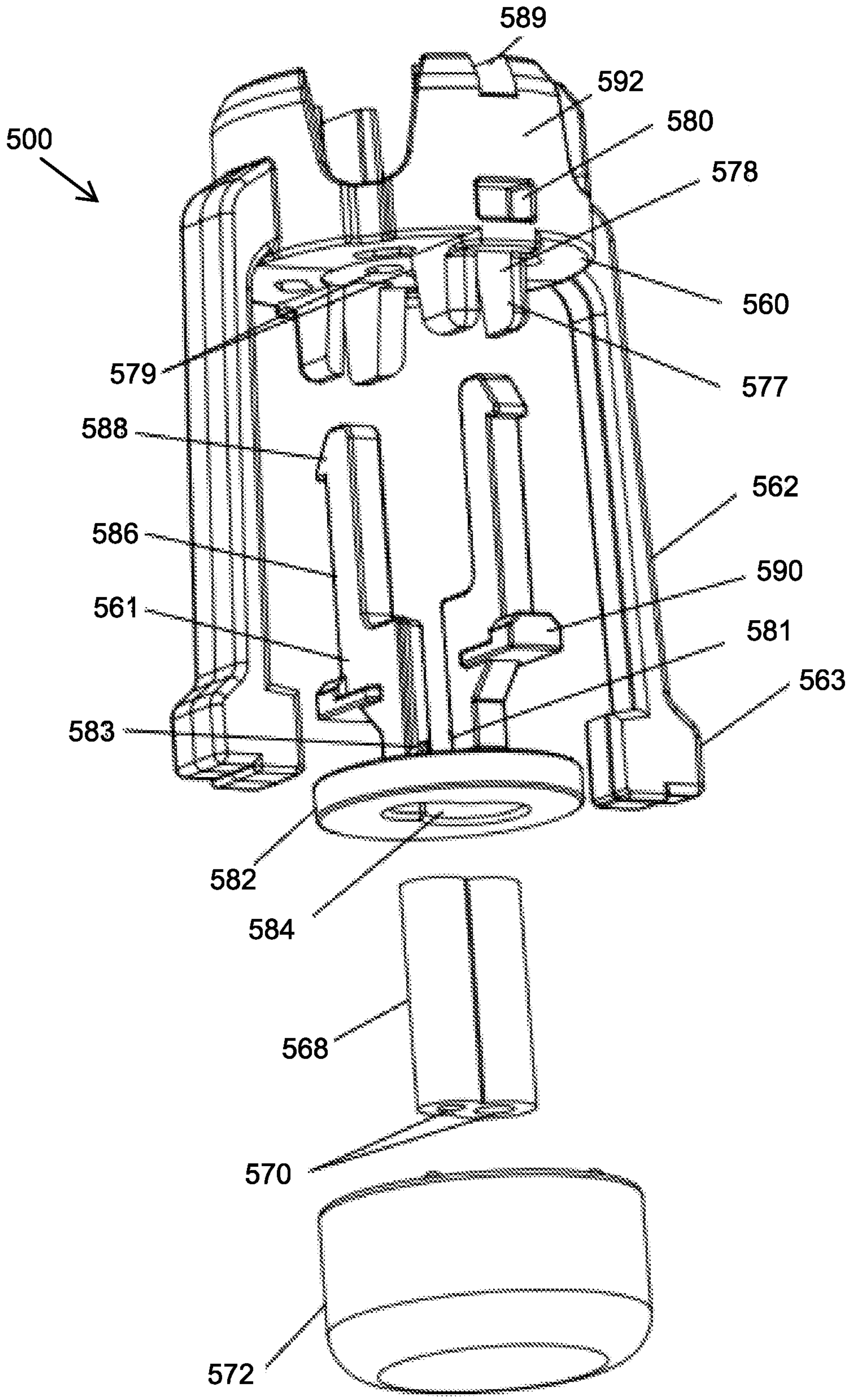
Fig. 14 Prior Art
FIG. 14 schematically shows an exploded view of a septum holder for a single membrane seal actuator in a connector section.

Septum holder 600 is identical to septum holder 500 shown in FIG. 14 with the exception of the distal end of the inner facing side of the arms 662 that are connected to the body part of the septum holder. Septum 672 is shown fitted over the septum support. On the outer side of arms 662 are distal enlarged elements 668 and on the inner side of the arms opposite the enlarged elements 668 are distinctively shaped protrusions 602 comprising for example as shown, vertical and horizontal bars in the shape of an inverted letter L. As shown in FIG. 20*a*, the upwardly projecting structure 306 comprises a socket 604 in the shape of an inverted letter "L" on its side below septum 622. Socket 604 has a shape and dimensions which match those of the distinctively shaped protrusions 602 on the arms of the septum holder allowing protrusions distinctively shaped 602 to fit into sockets 604 connecting the septum holder to the vial adapter. On the other hand, the components of the closed system comprise protrusions and sockets having other shapes than those of the components of an open system, for example for a closed system, the protrusion on the arms could be a vertical bar and the socket a vertical slot. In this case, as shown in FIG. 20*b*, the horizontal bar at the top of distinctively shaped protrusion 602 will prevent protrusion 602 from entering vertical socket 606 on the upwardly projecting structure 220 of the closed system vial adapter, thereby preventing connecting the open system septum holder to the closed system vial adapter. It is noted that the shapes of the protrusions and sockets described are for illustrative purposes only and many other distinctive shapes could be used for the same purpose.

Figure 21A:
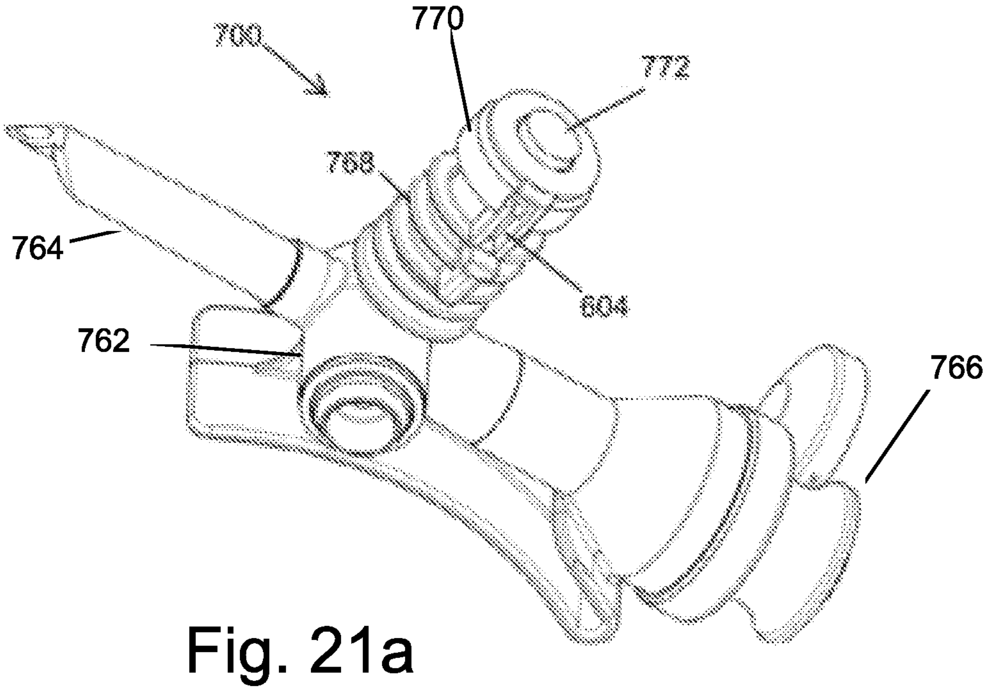
FIG. 21*a* schematically illustrate a spike adapter for connection to an IV bag.

FIG. 21*a* schematically shows a spike adapter 700 used in conjunction with fluid transfer apparatus 10 to transfer a drug to and from an intravenous (IV) bag. Spike adaptor 700 comprises body 762 terminating in a spike element 764 at the proximal end and a standard port 766 for connecting an infusion set at the distal end. Substantially at right angles to body 762 is a longitudinal extension 768. At the end of longitudinal extension 768 are membrane enclosure 770 and membrane 772. On the side of longitudinal extension 768 below membrane enclosure 770 is a socket 604 configured to match with the distinctively shaped projections on the arms of a septum holder in a connector as shown in FIG. 20*a*. A connector section, e.g. connector 452 (see FIG. 18) with attached conventional syringe can connect to longitudinal extension 768 exactly as described herein above with respect to connection to vial adaptor 300 in FIGS. 19*a*-19*c*, thereby allowing insertion of a drug from the syringe into an IV bag or withdrawal of liquid from an IV bag into a syringe to be used for reconstitution of a drug.

Figure 21B:
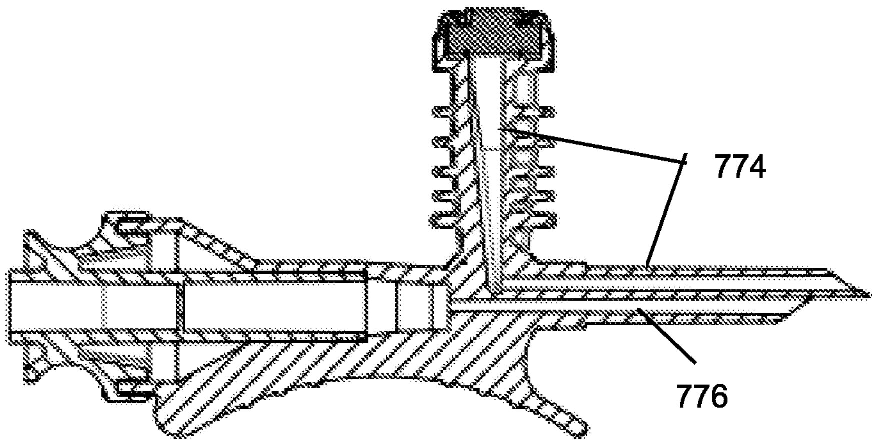
FIG. 21*b* is the cross-sectional view of the spike adapter of FIG. 21*a;*
Figure 22A:
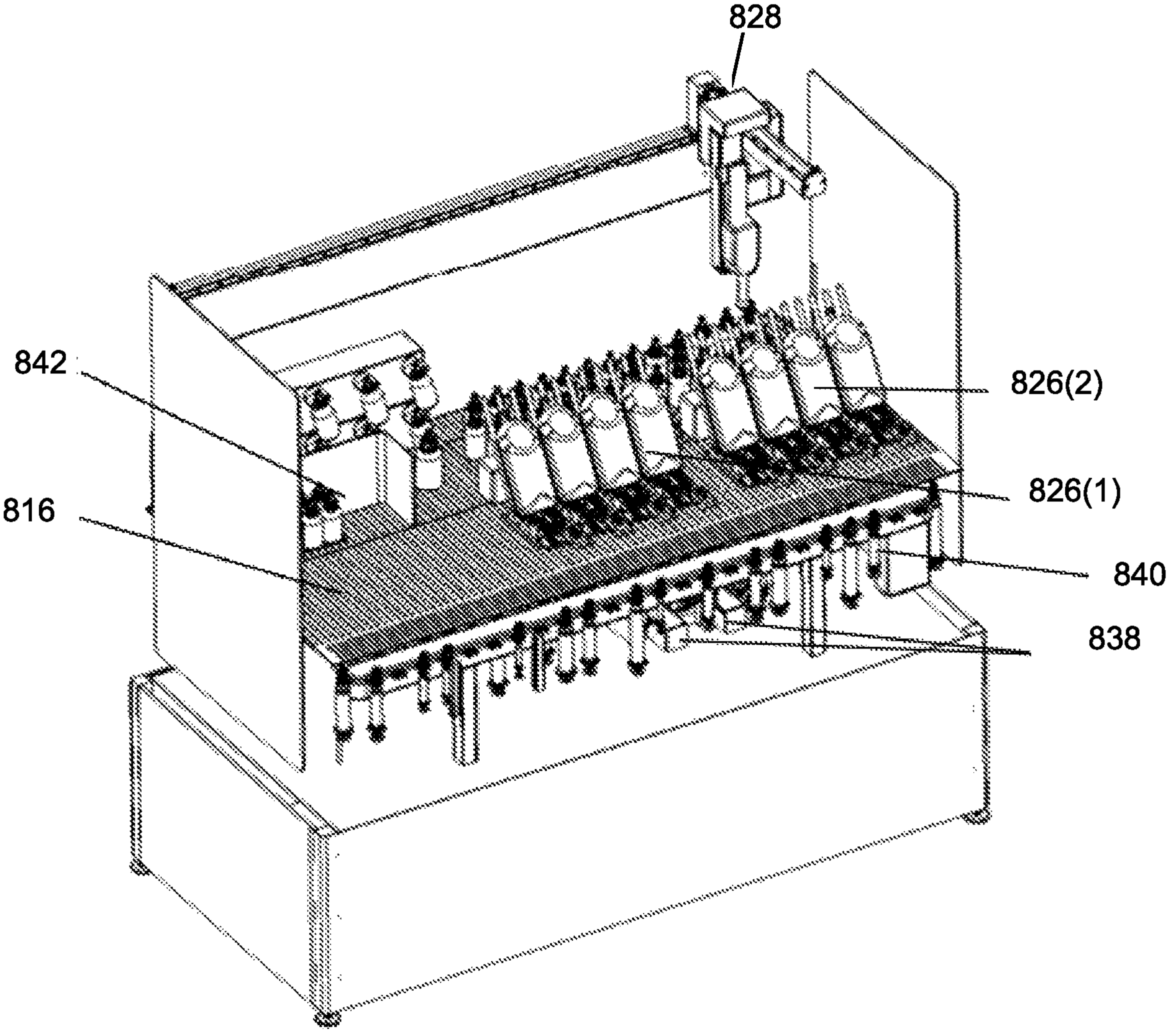
Fig. 22a Prior Art
FIG. 22*a* is a schematic view of the interior of the safety cabinet of a robotic system for preparing drugs and medications for administration to patients.
Figure 22B:
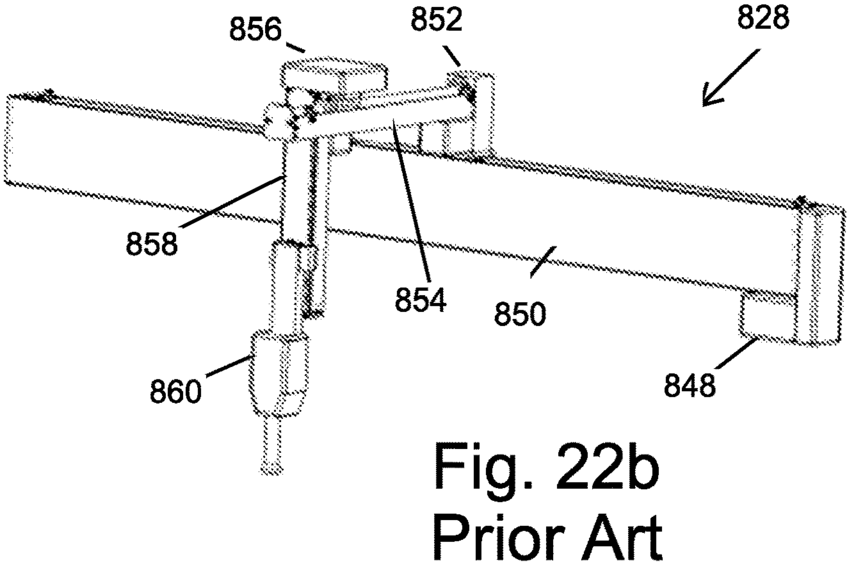
Fig. 22b Prior Art
FIG. 22*b* schematically shows vial robotic arm assembly.
Figure 22C:
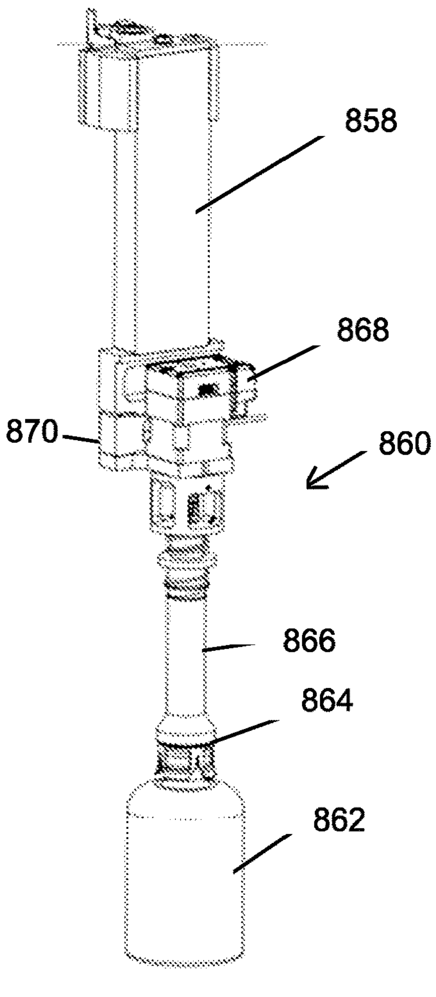
Fig. 22c Prior Art
FIG. 22*c* schematically shows the vial gripper assembly.
Figure 22D:
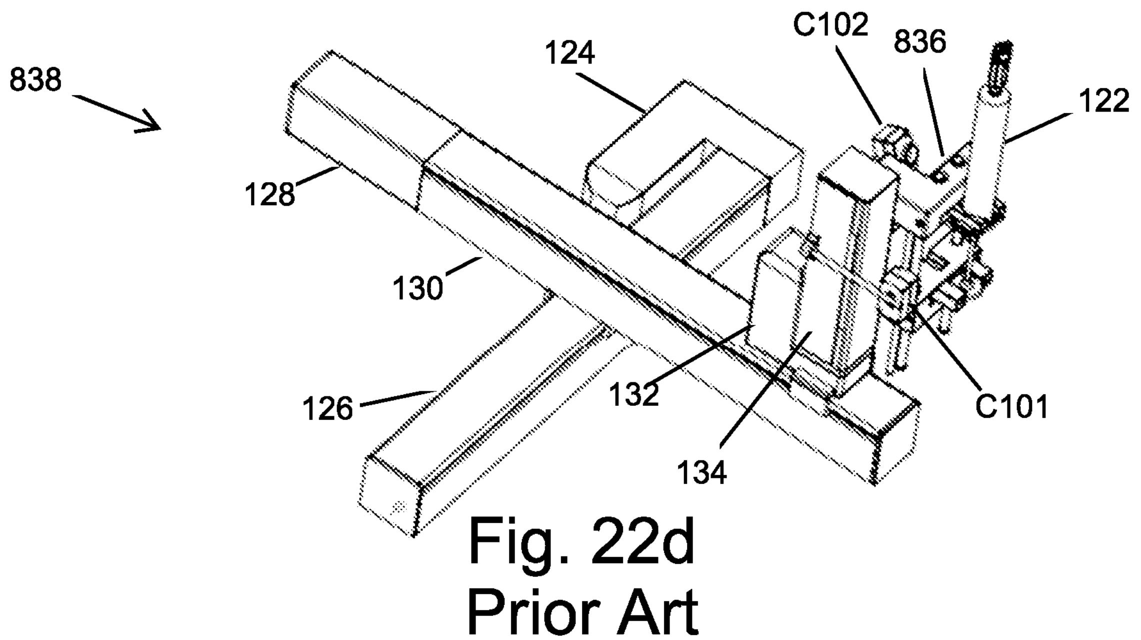
Fig. 22d Prior Art
FIG. 22*d* schematically shows the syringe pump robotic arm assembly.
Figure 22E:
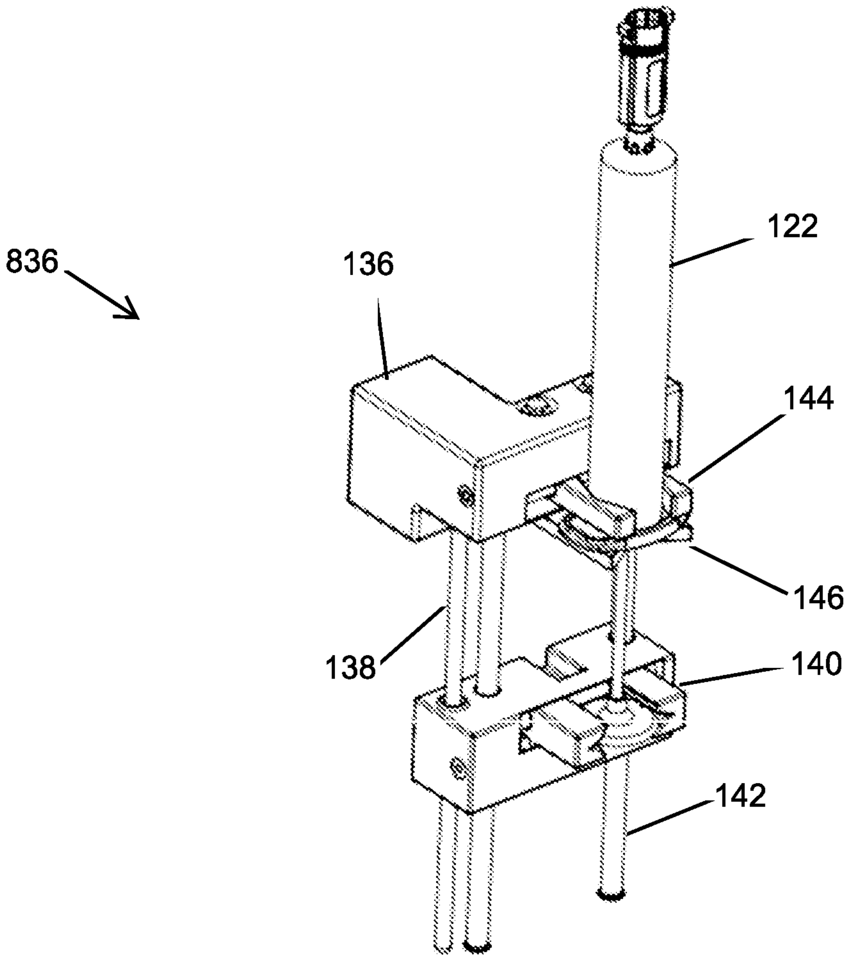
Fig. 22e Prior Art
FIG. 22*e* schematically shows the syringe pump.
Figure 23:
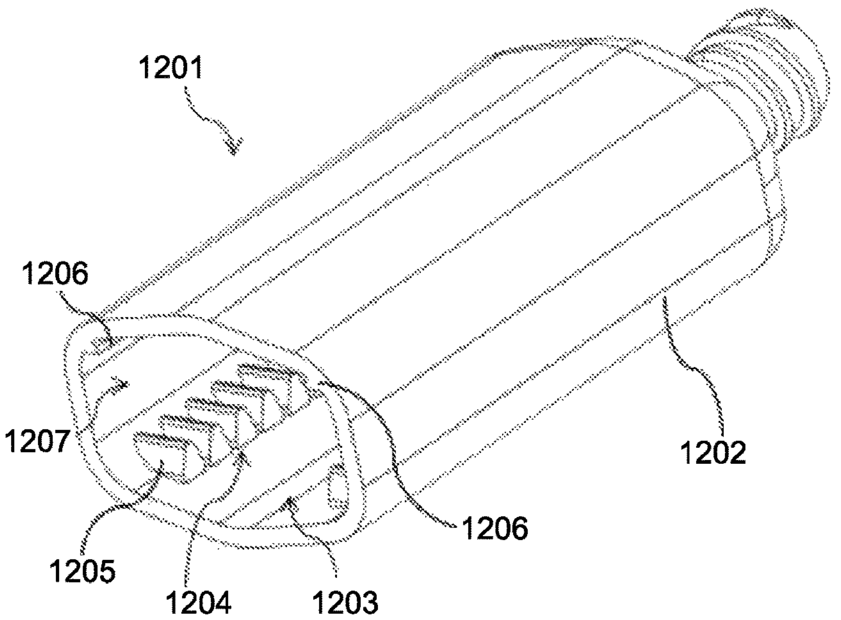
Fig. 23 Prior Art
FIG. 23 schematically illustrates a perspective view of a prior art female connector body.

FIG. 21*b* is a cross-sectional view of the spike adapter. In this figure can be seen that the interior of spike adapter 700 comprises two separated channels 774 for liquid and 776 for air. In this open system spike adapter liquid channel 774 passes from the tip of spike element 764 to membrane 772 for use if liquid is to be transferred into or out of the IV bag from a syringe. Channel 776 passes from the tip of the spike to port 766 to transfer liquid from the IV bag to the patient. In an open system for injection or withdrawal of liquid from a syringe to an IV bag there is no need for venting because, unlike a stiff glass vial, an IV bag is flexible allowing it to expand when pressurized or contract when it is evacuated.

The apparatus for securing a male-female connection described with respect to FIGS. 23-29 can easily be modified mutatis mutandis for use with an open drug transfer system. For the open system, the female connector, e.g. the connector section 452 in FIGS. 18*a*-18*c* would have only one needle and septum holder 500 could be replaced with the ladders, gears, and other features of female connector 1201. The vial adapters vial adapters of FIGS. 15*a* and 17 and the spike adapter of FIG. 21*a* would also be modified such that their upwardly projecting structures 306, 46, and 768 would have smooth sides and two anchoring ledges 1223 on opposite sides near the top.

Figure 27A:
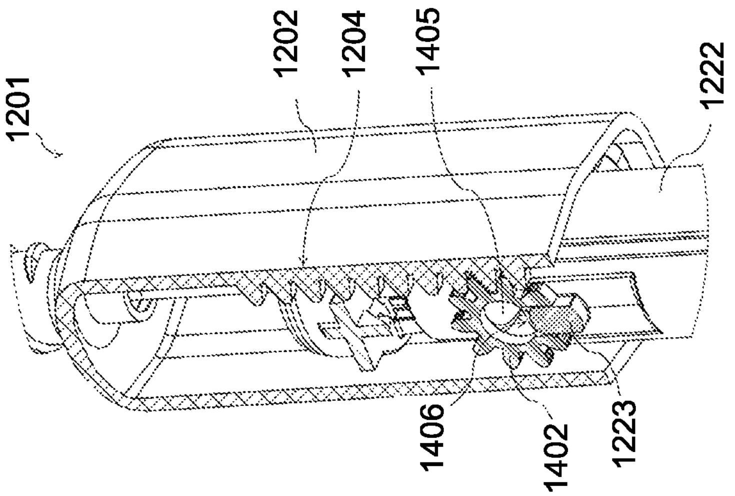
Fig. 27a Prior Art
FIGS. 27*a*-27*c* are cutaway perspective views of a prior art male section inserted into the female connector body of FIG. 23 in multiple sequential positions.
Figure 27B:
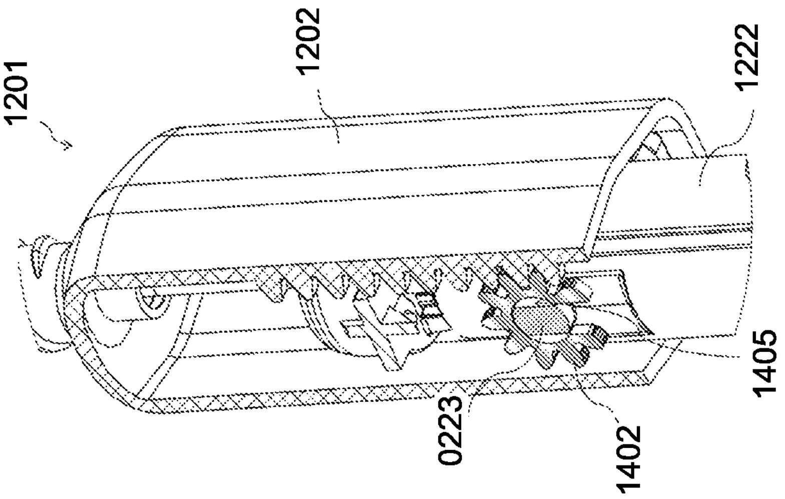
Fig. 27b Prior Art
Figure 27C:
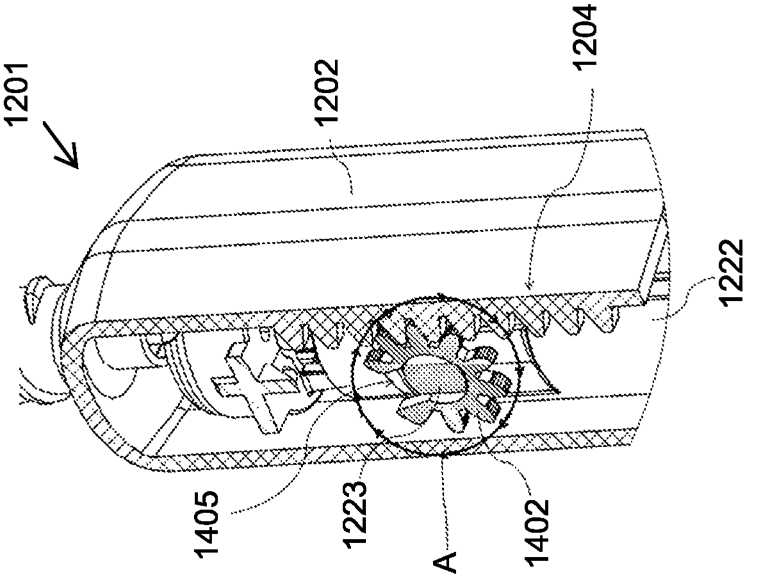
Fig. 27c Prior Art
Figure 28:
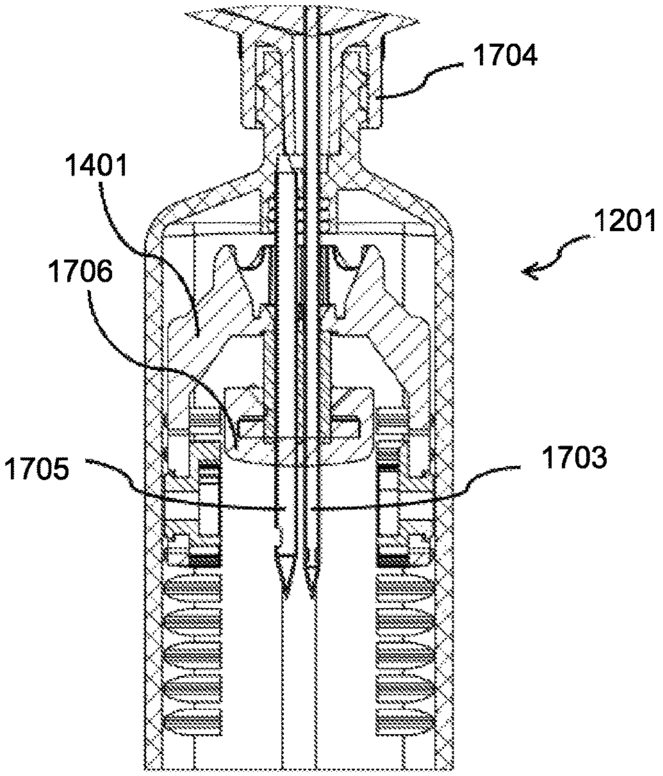
Fig. 28 Prior Art
FIG. 28 is a cross-section showing the female connector of FIG. 23 where the actuator of FIG. 24 has been pushed up artificially for clarity purposes without inserting a male connector, thus exposing the needles that have passed through the actuator's membrane.
Figure 29:
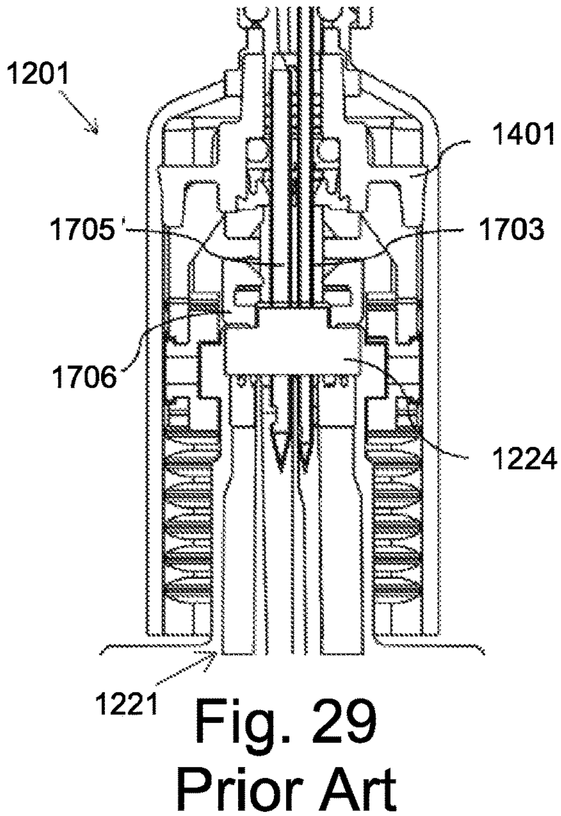
Fig. 29 Prior Art
FIG. 29 shows a cross-section of the male and female connectors of FIGS. 26 and 25, in a position in which they have been brought into close proximity such that their relative membranes press on one another thus preventing liquid leakage, and the needles have perforated both membranes and are located inside the vial, viewed from the front.

Referring to FIG. 27*a*, it can be seen how the components are configured to prevent connection of open and closed system components together. For example, for a closed system the ledge 1223 can be wider than the gap 1406 in gear 1405 of the securing actuator 1401 for an open system, thereby preventing connection of a closed system vial adapter to an open system connector 1201. Alternatively, for an open system the ledge 1223 can be wider than the gap 1406 in gear 1405 of the securing actuator 1401 for a closed system, thereby preventing connection of an open system vial adapter to a closed system connector 1201.

The components of an open system described herein have been developed for use in a robotic system that can be installed in hospital pharmacies to assist in the compounding of medications comprising non-hazardous drugs and to prepare syringes and IV bags comprising the required amount of liquid drug for administration to patients according to their individual prescriptions. The robotic system is similar to the one described in the background section for use with hazardous drugs and shown in FIG. 22. In compliance with regulations the two robotic systems will be kept in separate rooms in the pharmacy.

For non-hazardous drugs the safety requirements are much less restrictive; however, exactly as in the case of the system for hazardous drugs, the system comprises at least two robotic arm assemblies configured to simultaneously move vials and syringes within the cabinet. Each of the robotic arm assemblies comprises three mechanical arrangements configured to independently move either a vial gripper assembly or a syringe gripper assembly and syringe pump in three dimensions along three mutually orthogonal beams. Within the laminar flow cabinet is a plurality of operational stations adapted to perform specific tasks related to the compounding process. The operating stations include: at least one reconstitution module; at least one vial shaker module; at least one vial flipper module; at least one IV bag base module to which the operator of the system can attach IV bags; a syringe magazine; a plurality of cameras each installed at a specific location in the cabinet or on the robotic arm assemblies, and a processor. Each of the cameras is dedicated to provide real time digital images of the stage of the preparation process carried out at its location. Dedicated software and algorithms in the system processor allow almost all steps in the compounding process to be carried out automatically by the robotic arm assemblies without intervention by the operator or a supervisor and the cameras and imaging process algorithms are adapted to provide real-time feedback control of all stages of the compounding process.

One important difference between the robotic system developed for the closed transfer system and one for use in an open system is that the that closed transfer system relies on the use of Equashield® syringes that have to be manufactured in perfect orientation and alignment with their connectors. This is important because the Equashield® syringes will be gripped and placed when the connector extending shoulders and the extensions on the syringe barrel are always in same position relative to each other and due to this identical orientation only simple griping mechanisms are required and processes of placing and handling the syringes is an easy and fast task to accomplish. Unlike the well aligned Equashield® syringes, the open transfer system uses conventional syringes from various manufacturers and various shapes and dimensions, and the connector shoulders on the arms and the extensions on the syringe barrel are seldom in same position relative to each other, a fact that requires special mechanisms integrated into the robot to grip the connector and the syringe in varying orientations. This also requires software that can deal with various syringes, various orientations, identifying them and reading the right dosage.

In using the robotic system, the prescriptions to be filled are entered into the system processor, which prompts the user to insert drug vials containing the required medicines into the cabinet, to load syringes of the required sizes into the syringe magazine, and attach IV bags to the IV bag base modules.

In order for the robotic arms to be able to grab the vials and syringes, the user connects a vial adapter to each vial and a connector section to each syringe before placing them in the cabinet. After the drug vials, syringes, and IV bags are placed in the cabinet, all further operations of compounding the drugs and preparing the required doses in syringes or IV bags for administration to a patient are carried out automatically by the robotic arms as instructed by the processor under supervision of the cameras.

Figure 24:
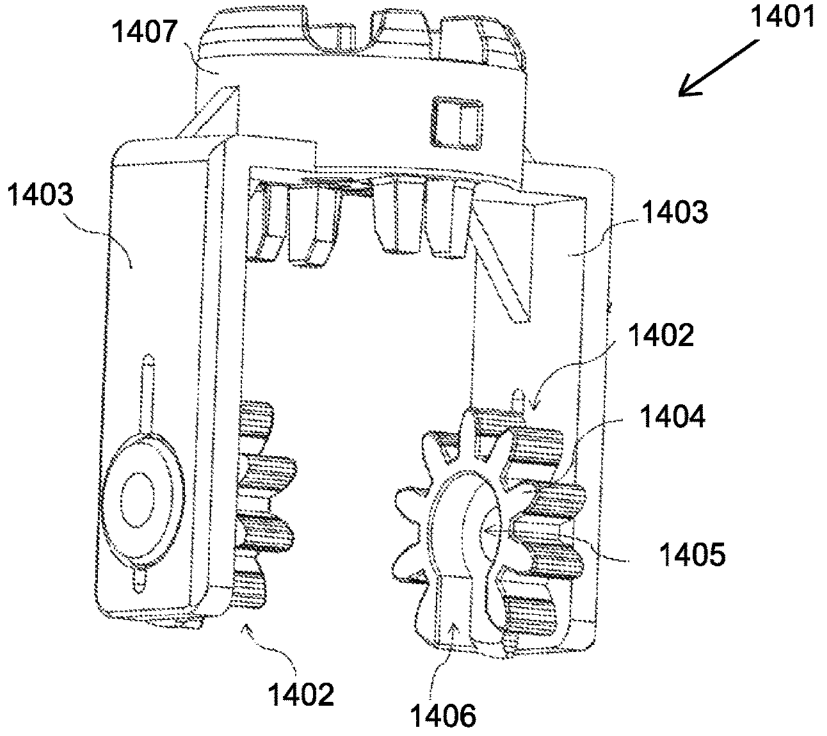
Fig. 24 Prior Art
FIG. 24 is a perspective view of a prior art securing actuator.
Figure 25:
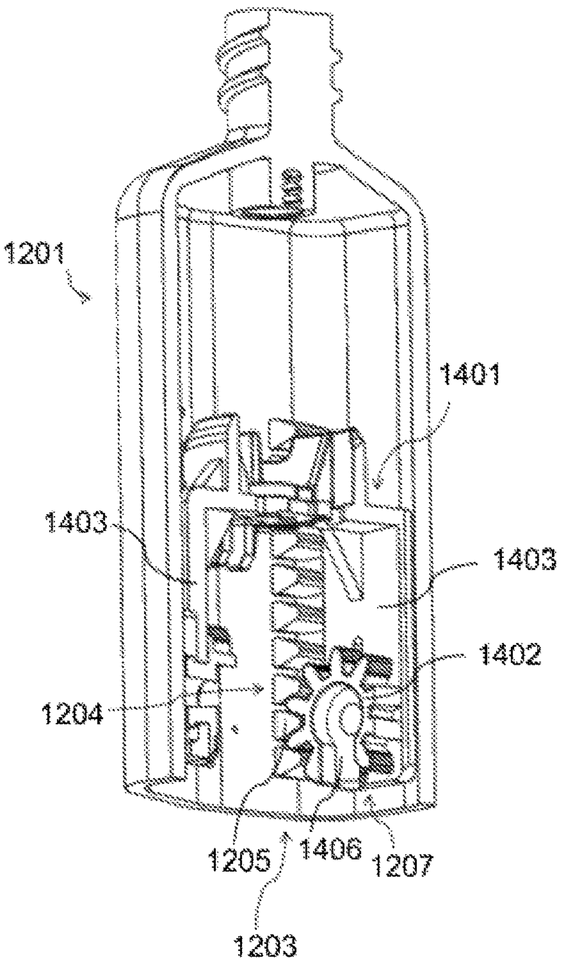
Fig. 25 Prior Art
FIG. 25 is a cutaway perspective view of the female connector body of FIG. 23 with the securing actuator of FIG. 24 present therein.
Figure 26:
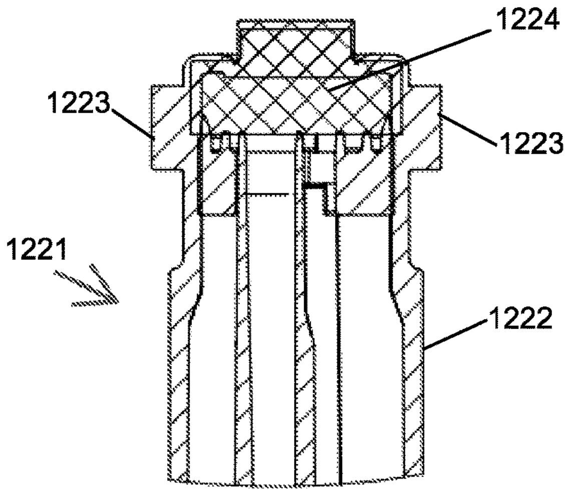
Fig. 26 Prior Art
FIG. 26 is a cross-section view of an upper part of a prior art male connector.

In the open transfer robotic system the cameras and software are configured to recognize the sockets 604 and protrusions 602 on the vial adapter 220 and septum holder 600 in FIGS. 20*a* and 20*b* and the gaps 1406 and void portions 1405 in the securing actuator and ledges 1223 on the male connector 1221 in FIGS. 24 and 26 and to warn the user if the wrong components are introduced into the cabinet. Additionally, as a safety feature, the robotic arm assemblies comprise mechanical features, e.g. projecting pins that must fit matching slots on the components to be picked up, to insure that only the components compatible with an open transfer system are being used.

Open transfer components for use with the robotic system constitute two kits—a basic kit will contain a vial adapter and a connector section and an extended kit that additionally contains an IV spike adapter. The kits will come in several embodiments to include vial adapters suitable for different sized vials and connectors have different types of connections, e.g. Luer lock or bayonet connectors to mate with standard needless syringes.

Although embodiments of the invention have been described by way of illustration, it will be understood that the invention may be carried out with many variations, modifications, and adaptations, without exceeding the scope of the claims.

The invention claimed is:

1. A robotic system for compounding and preparation of medications including non-hazardous drugs, the robotic system comprising:

a laminar flow cabinet;

at least one robotic arm; and at least one vented drug vial adapter;

wherein the at least one vented drug vial adapter and robotic system are configured to allow liquid to be drawn out of a drug vial and inserted into a drug vial;

wherein said at least one vented drug vial adapter comprises:

a liquid conduit extending at least partially through the at least one vented drug vial adapter;

a top part comprising a hollow air chamber at least partially surrounding the liquid conduit, said top part further comprising a vent hole configured to allow fluid communication between the hollow air chamber and an exterior of the at least one vented drug vial adapter;

a bottom part connected to the top part; and a hydrophobic venting filter positioned between the top part and the bottom part.

2. The robotic system of claim 1, further comprising: (i) at least two robotic arm assemblies configured to prepare syringes and intravenous (IV) bags comprising a prescribed amount of liquid drug for administration to patients according to their individual prescriptions by moving drug vials to which ventilated vial adapters have been connected and syringes within the laminar flow cabinet, (ii) cameras, and (iii) a system processor comprising software comprising imaging process algorithms that are adapted to provide real-time feedback control of all stages of the compounding process.

3. The robotic system of claim 2, wherein the at least two robotic arm assemblies are configured to move in three mutually orthogonal directions.

4. The robotic system of claim 3, further comprising at least two robotic arm assemblies configured to prepare syringes and IV bags comprising the required amount of liquid drug for administration to patients according to their individual prescriptions by moving drug vials, to which ventilated vial adapters have been connected, and syringes, to which connector sections have been connected, within the laminar flow cabinet and cameras and a system processor comprising imaging process algorithms that are adapted to provide real-time feedback control of all stages of the compounding process, wherein:

a) the connector sections each comprise one of:

(i) a septum holder comprising two resilient elongated arms that project vertically downwards parallel to each other attached to the side of the body part, each arm having distinctively shaped protrusions on the inner side of the distal ends of the arms; or (ii) a securing actuator section comprising at least one rung formed on the inside wall of the connector section and at least one rotatable gear comprising sprockets peripherally arranged around the gear, a void portion configured to house an anchoring ledge, and a gap formed in the gear such that the void portion is provided with an opening the orientation of which changes with the rotation of the gear;

b) the ventilated drug vial adapters each comprise one of:

(i) an upwardly projecting portion comprising a membrane at a proximal end and sockets on an outside proximal end, the sockets having a shape and dimensions configured to match those of the distinctively shaped protrusions on the inside of the arms of the septum holder; or (ii) an upwardly projecting portion comprising a membrane at a proximal end and anchoring ledges on an outside proximal end, the anchoring ledges having a shape and dimensions configured to pass through the gap and fit into the void in the gear of the securing actuator section of the connector;

thereby allowing the connector sections to be connected only to drug vials connected to ventilated vial adapters comprising compatible sockets or anchoring ledges on the outside surface.

5. The robotic system of claim 4, wherein the distinctively shaped protrusions are on the outside of the upwardly projecting structure of the vial adapter and the matching sockets are on the inner side of the arms of the septum holder in the connector section and holder and on the distal end of the gripper assembly.

6. The robotic system of claim 4, further comprising a spike adapter configured for connection to an intravenous (IV) bag, the spike adapter comprising:

a) a body terminating in a spike element at the proximal end of the body, the spike element comprising separate liquid and air channels;

b) a standard port for connecting an infusion set at the distal end of the body, the standard port in fluid communication with the air channel in the spike; and c) a longitudinal extension connected substantially at right angles to the body, the proximal end of the longitudinal extension comprising a membrane and configured to be coupled with the connector section, and the longitudinal extension comprising a liquid channel in fluid communication with the liquid channel in the spike;

the spike adapter characterized in that the longitudinal extension comprises one of: (i) a socket having a shape and dimensions configured to match those of the distinctively shaped protrusions on the arms of the septum holder; or (ii) anchoring ledges having a shape and dimensions configured to pass through the gap and fit into the void in the gear of the securing actuator section of the connector section; thereby allowing the spike adapter to be connected only to the connector section of claim 4.

7. The robotic system of claim 4, wherein the cameras and software are configured to recognize the sockets, protrusions, the gaps, void portions and anchoring ledges and to warn the user if the wrong components are introduced into the cabinet; and the robotic arm assemblies comprise mechanical features to insure that only the components compatible with an open transfer system are being used.

8. The robotic system of claim 3, wherein the at least two robotic arm assemblies are configured to pick up, move, and release syringes comprise special mechanisms to grip the connector and the syringe in varying orientations and the system requires software configured to deal with various syringes and various orientations, identifying them and reading the right dosage; thereby allowing the system to use conventional syringes from various manufacturers and various shapes and dimensions.

* * * * *